United States Patent
Mathys et al.

(10) Patent No.: US 12,429,054 B2
(45) Date of Patent: Sep. 30, 2025

(54) ROTARY COMPRESSOR DRIVE LINE

(71) Applicant: ATLAS COPCO AIRPOWER, NAAMLOZE VENNOOTSCHAP, Wilrijk (BE)

(72) Inventors: Flip Frans Mathys, Wilrijk (BE); Thomas Luc Swerts, Wilrijk (BE); William Maria Dominic Jacobs, Wilrijk (BE); Tom Raymond Jozef Hendrik De Vloo, Wilrijk (BE); Dimitri Dewil, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 0 days.

(21) Appl. No.: 18/291,541

(22) PCT Filed: Jul. 20, 2022

(86) PCT No.: PCT/EP2022/070365
§ 371 (c)(1),
(2) Date: Jan. 23, 2024

(87) PCT Pub. No.: WO2023/016766
PCT Pub. Date: Feb. 16, 2023

(65) Prior Publication Data
US 2024/0344517 A1    Oct. 17, 2024

(30) Foreign Application Priority Data
Aug. 12, 2021   (BE) .................... 2021/5642

(51) Int. Cl.
*F04C 18/08*    (2006.01)
*F04C 29/00*    (2006.01)
*F04C 29/02*    (2006.01)

(52) U.S. Cl.
CPC ........ *F04C 29/0071* (2013.01); *F04C 18/084* (2013.01); *F04C 29/023* (2013.01);
(Continued)

(58) Field of Classification Search
CPC ...... F04C 18/082; F04C 18/084; F04C 18/16; F04C 29/0071; F04C 29/0078;
(Continued)

(56) References Cited

U.S. PATENT DOCUMENTS

2016/0319832 A1 * 11/2016 Takahara .............. F04D 29/266
2018/0306189 A1   10/2018 De Bontridder et al.
(Continued)

FOREIGN PATENT DOCUMENTS

CN    104373378    2/2015
CN    108730191    11/2018
(Continued)

OTHER PUBLICATIONS

CN116892514A—Korthudt et al.—Rotating Element And Compressor Assembly Comprising Such A Rotating Element—Oct. 17, 2023 English machine Translation. (Year: 2023).*

(Continued)

*Primary Examiner* — Theresa Trieu
(74) *Attorney, Agent, or Firm* — HSML P.C.

(57) ABSTRACT

A drive train, specifically to a direct coupling of a drive shaft to a driven shaft provided in the drive train of a rotary compressor. Additionally, an integration of a lubricant circuit, including all associated channels and components, in the drive train.

16 Claims, 9 Drawing Sheets

(52) U.S. Cl.
CPC ........ *F04C 29/025* (2013.01); *F04C 2240/60* (2013.01); *F04C 2240/603* (2013.01)

(58) Field of Classification Search
CPC .. F04C 29/023; F04C 29/025; F04C 2240/60; F04C 2240/603; F04C 2240/809; F16D 1/09; F16D 1/092; F16B 7/02
See application file for complete search history.

(56) References Cited

U.S. PATENT DOCUMENTS

| | | | | |
|---|---|---|---|---|
| 2019/0048938 | A1* | 2/2019 | Demtröder | F16D 1/092 |
| 2020/0011380 | A1* | 1/2020 | Eisele | F16D 1/092 |

FOREIGN PATENT DOCUMENTS

| | | |
|---|---|---|
| DE | 9416348 | 11/1994 |
| JP | H06280761 | 10/1994 |
| JP | 10-82396 | 3/1998 |
| JP | 2002168184 | 6/2002 |
| WO | 2005/036004 | 4/2005 |
| WO | 2017-038334 | 3/2017 |

OTHER PUBLICATIONS

International Search Report for PCT/EP2022/070365 dated Oct. 10, 2022 (4 pages).
Search Report for BE202105642 dated May 3, 2022 (11 pages).
International Preliminary Examining Report for PCT/EP2022/070365 dated Sep. 21, 2023 (5 pages).
Written Opinion for PCT/EP2022/070365 dated Oct. 10, 2022 (6 pages).
Japanese Office Action issued in JP 2024-506653, dated Dec. 24, 2024, 5 pages, English translation.
Chinese Office Action issued in CN Application No. 202210959825, dated May 16, 2025, 17 pages, English translation.
Japanese Office Action issued in JP Application No. 2024-506653, dated Jul. 17, 2025, 26 pages, English machine translation provided.

* cited by examiner

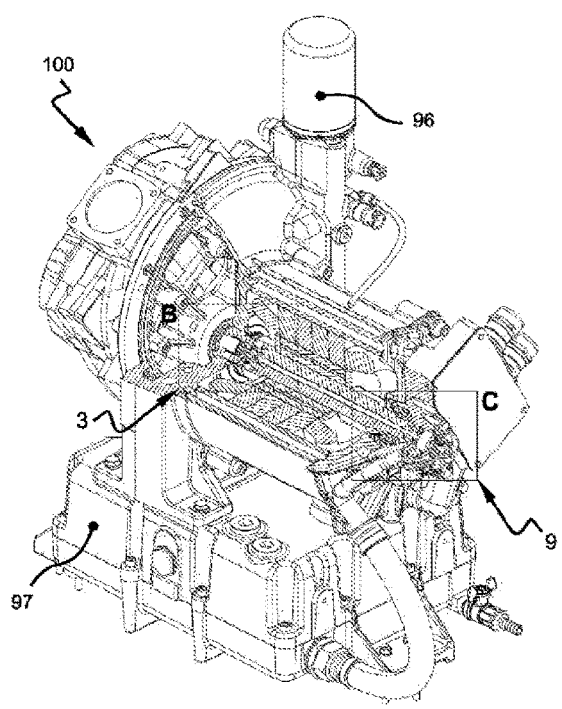
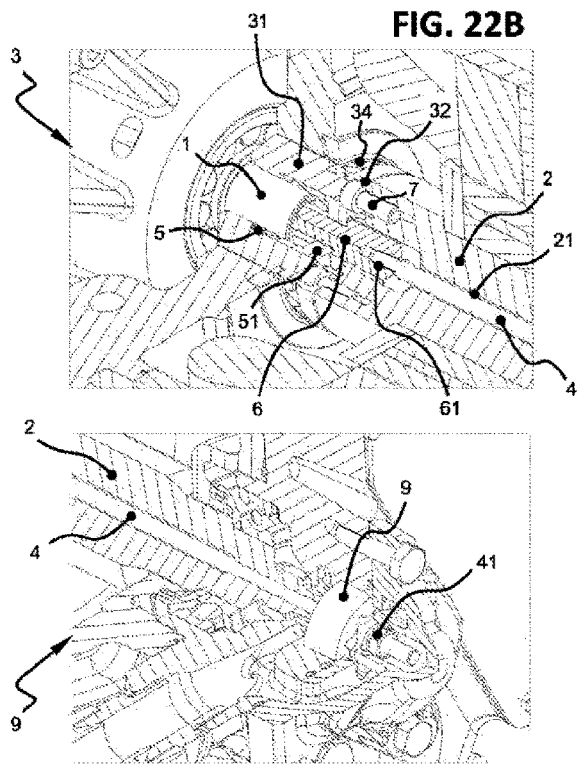
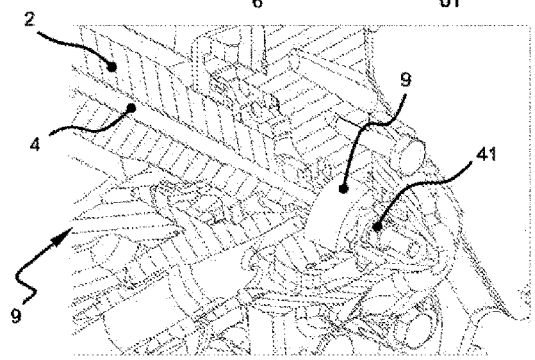
FIG. 22A
FIG. 22B
FIG. 22C
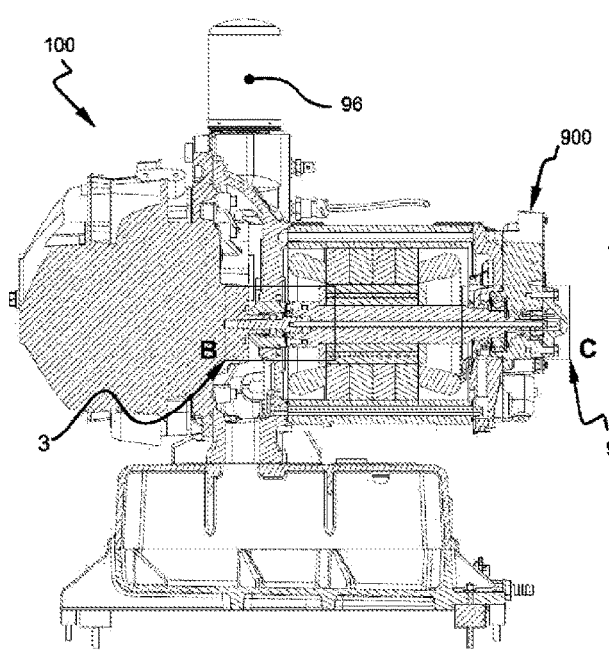
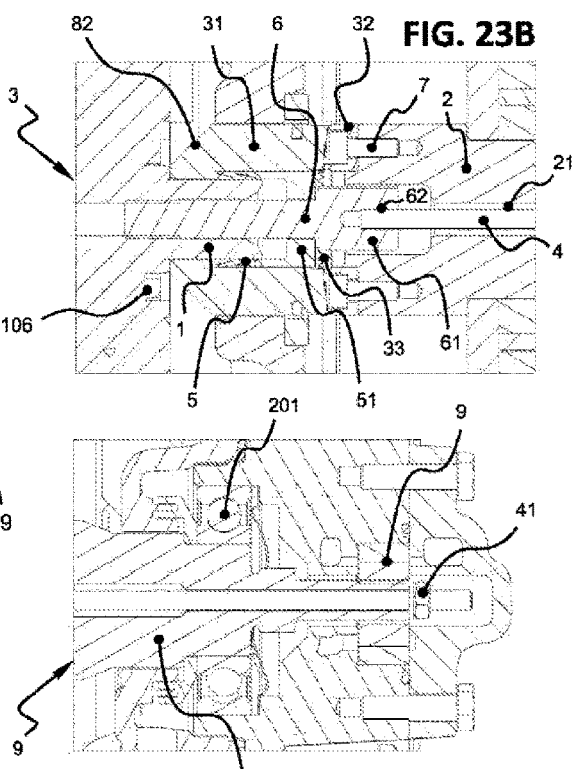
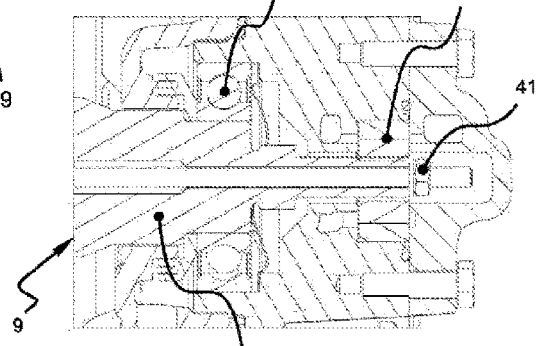
FIG. 23A
FIG. 23B
FIG. 23C

ROTARY COMPRESSOR DRIVE LINE

DOMAIN OF THE INVENTION

The present invention relates to a drive train for an oil-free rotary compressor, specifically to a coupling for directly coupling a drive shaft to a driven shaft for driving a compression element, in particular a tooth or set of movable teeth, which are movable arranged in an oil-free compression chamber of the rotary tooth compressor. The invention also further relates to a direct connection of a lubricant circuit, including all associated channels and components, to this drive train.

TECHNOLOGICAL BACKGROUND

Oil-free rotary compressors can be used to produce a wide range of products from semiconductors to pharmaceuticals and paper. Oil-free refers to the absence of lubrication in the compression chamber. A typical oil-free rotary compressor consists of a compression element, arranged in an oil-free compression chamber, specifically a tooth or set of movable teeth, and a motor that drives the movement of the compression element.

In state-of-the-art systems, driving is achieved by an indirect coupling between the driving motor and the driven compression element, for example via a series of gears. In the latter case, a drive gear can be mounted on a shaft driven by the motor (the driving shaft or drive shaft), which acts via a pinion on a shaft driving the compression element (the driven shaft). It is clear that a direct coupling of a drive shaft to a driven shaft in a rotary compressor can provide specific benefits, were it not for the fact that it requires a specific design of the drive train. To clarify, because a gear ratio cannot be used to compensate for a lower rotary engine speed, a direct drive shaft will experience a large torque load with a high operational rotational speed. This means that a maintenance-free coupling must be very robust to prevent any form of damage and wear. Also, the material properties of all parts must be carefully taken into consideration, for example the coefficients of thermal expansion, coefficients of friction, and so on.

A further factor that can complicate a direct coupling design is the hot environment, typically contaminated with oil or other contaminants. Compressors, however, require some form of lubricant to cool, seal and/or lubricate certain internal components, such as the bearings arranged around the drive shaft. Alternative components that do not require lubrication, such as "greased for life" or magnetic bearings, are well known, but are generally not suitable for applications with long lifetime requirements, high loads and/or high rotational speeds or give rise to increased complexity and/or energy consumption.

The required lubrication is usually supplied by means of an integrated oil circuit, which is supplied with the required injection pressure by an external, for example electrically driven pump. However, an externally driven pump requires the presence of an additional drive and associated control unit, which increase the complexity of the compressor. This creates the risk that the external pump could fail inadvertently, for example as a result of a power failure or control error, causing the drive train to continue running indefinitely without the necessary lubrication, leading to accelerated wear of the components.

Therefore, there is a need to develop a solution to overcome the shortcomings of the prior art. In particular, there is a need for a direct coupling with which a high power and/or high-speed torque, typical of a drive train of a rotary compressor, can be achieved between a drive shaft on the one hand and a driven shaft arranged in a drive train of a rotary compressor on the other hand.

SUMMARY

In order to meet the above-described needs and shortcomings of the prior art, the inventors provided a coupling which can provide a torque with a high power and/or high rotational speed, typical for a drive train of a compressor can be achieved between a drive shaft on the one hand and a driven shaft on the other hand, arranged in a drive train of a rotary compressor. The coupling described herein may also significantly improve the lifetime of the drive train, without or with limited maintenance requirements, even in a very hot environment and/or in an environment polluted with oil or contaminants. In addition, the coupling described herein may also allow for easier and faster mounting and/or dismounting (i.e. decoupling of the shafts) of the drive train in a blind or difficult-to-access space, as well as easier and faster mounting and replacement of damaged or worn parts. In addition, the coupling described herein allows a simple and robust construction, wherein the number of separate components of the compressor and the drive train can be reduced, which also leads to a more reliable, more compact, less cooling, less lubrication and/or less maintenance requiring embodiment.

As will become apparent from the present description, the coupling described herein may further permit integration of a lubricant pump such as an oil pump, which is configured to drive a lubricant circuit, in a same drive train. Such integration is difficult due to the high speed, typical of a compressor drive, which requires a smaller outer diameter of the drive shaft to avoid the risk of cavitation (i.e. the rotational speed should be limited to reduce the dynamic pressure in the pump) for coupling to the lubricant pump. As further elucidated, the dimensions of a coupling effected by means of a clamping force can be limited.

An aspect of the present invention concerns a coupling for a drive train of a rotary compressor configured to directly couple
- a driven shaft configured to drive a compression element, movably arranged in an oil-free compression chamber, such as a tooth or set of teeth, and
- a drive shaft driven by a driving element such as a motor;

the coupling comprising:
- a coupling hub arranged over a driven end of the driven shaft,
- a coupling disc attached and/or integrated to a driving end of the drive shaft;
- wherein the drive shaft comprises a hollow passage over its entire length, and the coupling comprises an elongated stud arranged in the hollow passage of the drive shaft, the stud being coupled to the driven end of the drive shaft and configured to clamp the coupling disc to the coupling hub.

In an embodiment, the coupling further comprises tensioning element, arranged on the stud, which is configured to tension the stud against a non-driving end of the drive shaft to apply a, preferably controllable, clamping force to the coupling.

In an embodiment, the stud is secured against a non-driving end of the drive shaft by a tensioning element arranged over the stud, which exerts a, preferably controllable, clamping force on the coupling.

In an embodiment, the stud contains an externally threaded end over which the complementary internally threaded tensioning element can be tightened to secure the stud against the non-driving end of the drive shaft; preferably wherein the tensioning element contains a nut, or more preferably a lock nut.

In an embodiment, a surface of the coupling hub and an abutting surface of the coupling disk contain a plurality of mating radial grooves.

In a preferred embodiment, the mating radial grooves are of a Hirth type; preferably with a profile angle of 50 to 70 degrees, more preferably about 60 degrees.

In an embodiment, the coupling comprises a friction disk arranged between a surface of the coupling hub and an abutting surface of the coupling disk, which is configured to increase the coefficient of friction between the abutting surfaces.

In an embodiment, the coupling comprises a conical clamping ring arranged between the driven end of the driven shaft and the coupling hub, which is configured to clamp the driven shaft to the coupling hub; preferably a plurality of sequentially arranged conical clamping rings.

In an embodiment, the coupling comprises a fastening part which is arranged between the driven end of the driven shaft and the stud, which has a larger diameter than the stud and is configured to couple the stud to the driven shaft.

In an embodiment, the stud comprises an externally threaded end and the fastening part comprises a complementary internally threaded opening through which the stud can be screwed in; preferably wherein the fastening part comprises a bolt with a bolt head provided with an opening.

In an embodiment, the coupling comprises a fastening element arranged between the driving end of the drive shaft and the coupling disk, which is configured to clamp the drive shaft to the coupling disk; preferably a plurality of fastening elements.

In an embodiment, the fastening element comprises a bolt screwed into the driving end of the drive shaft.

In an embodiment, the non-driving end of the drive shaft is configured for connection to a lubricant pump arranged over the drive shaft, and wherein the stud protrudes beyond the lubricant pump.

In an embodiment, the coupling hub comprises a bevel arranged on a side face of the coupling hub and configured to direct injected lubricant to a component of the coupling requiring lubrication; preferably to a conical clamping ring arranged adjacent to the coupling hub.

A further aspect of the present invention relates to a drive train of a rotary compressor, the drive train comprising:
- a driven shaft configured to drive a compression element, movably arranged in an oil-free compression chamber, such as a tooth or set of teeth, and
- a drive shaft driven by a driving element such as a motor; and
- a coupling as described herein for directly coupling the driven shaft and the drive shaft.

A further aspect of the present invention relates to a rotary compressor, the rotary compressor comprising:
- a compression element, such as a tooth or set of teeth, movably arranged in an oil-free compression chamber, and a driven shaft configured to drive the compression element;
- a driving element, such as a motor, and a drive shaft driven by the driving element;
- a coupling as described herein for directly coupling the driven shaft and the drive shaft.

In an embodiment, the rotary compressor comprises a lubricant injector having a injector nozzle configured to inject a lubricant such as oil onto a side face of a coupling hub; and wherein the coupling hub comprises a bevel, arranged on a side face of the coupling hub, and configured to direct injected lubricant to a component of the coupling requiring lubrication; preferably to a bearing arranged adjacent to the coupling hub.

In an embodiment, the rotary compressor comprises a lubricant pump, such as an oil pump, configured to drive a lubricant circuit; wherein the lubricant pump is arranged over a non-driving end of the drive shaft and is connected such that the drive shaft drives the operation of the lubricant pump.

In an embodiment, the lubricant pump is connected to the drive shaft by means of a recess arranged in the lubricant pump, which is configured to connect with a projecting element arranged at the end of the drive shaft, or vice versa; preferably wherein the drive shaft comprises a keyway and a key arranged in the keyway.

In an embodiment, the lubricant pump comprises an outer rotor and an inner rotor (92) rotatably arranged in the outer rotor; wherein the outer rotor and inner rotor have complementary trochoidal profile shapes.

It is clear that further variants and/or combinations of embodiments are possible, especially with regard to the various aspects of the invention.

BRIEF DESCRIPTION OF THE FIGURES

To better demonstrate the features, structures or characteristics of the present invention, some embodiments of the present invention are shown in the accompanying figures without any limitation. The following description of these accompanying figures is illustrative only and is not intended to limit the subject matter, its application and/or use thereof. The numbering used in the accompanying figures serves to identify certain elements more easily, without limiting the illustrated elements and/or embodiments of the present invention thereto.

The following numbering is used throughout the figures, claims and description: drive train 10; drive train shaft 11; rotary compressor 100; driven shaft 1; drive shaft 2; hollow passage 21; coupling 3; driven part 3', coupling hub 31; coupling disc 32; radial grooves 33 (e.g. Hirth coupling); friction disc 34; elongated stud 4; tensioning element 41 (e.g. nut); clamping ring 5 (e.g. conical clamping ring); pressure ring 51; fastening part 6 (e.g. bolt); bolt head 61; opening 62, fastening element 7 (e.g. bolt); lubricant injector 8; injector nozzle 81; bevel 82; lubricant pump 9; outer rotor 91; inner rotor 92; keyway 94; key 95; oil pan 97; oil filter 96; first compressor element 101, second compressor element 102, timing gear 103, timing gear 104, pinion 105, bearing 106; bearing 107, bearing 108, bearing 109, motor 200, bearing 201, bearing 202, housing 300, transmission gear 302, bearing 303, bearing 304, flexible coupling 305, housing 900, axial clamping force A; radial clamping force R.

FIG. 15A is a side perspective drawing of a preferred embodiment of the compressor 100, wherein

FIG. 22A is a partial cross-sectional perspective view of a preferred embodiment of the rotary compressor 100, wherein FIG. 22B shows a detail view of the coupling 3 and FIG. 22C showing a detail view of the lubricant pump 9.

FIG. 23A is a partial cross-sectional perspective view of a preferred embodiment of the rotary compressor 100, wherein FIG. 23B shows a detail view of the coupling 3 and FIG. 23C shows a detail view of the lubricant pump 9.

FIG. 24A is a side perspective drawing of a preferred embodiment of the rotary compressor 100, wherein

DETAILED DESCRIPTION

Figure 1:
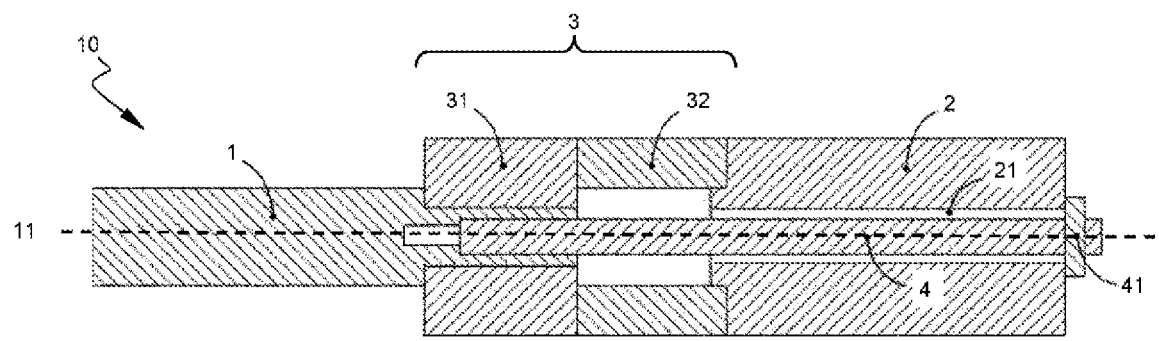
FIG. 1 is a schematic drawing of an embodiment of a coupling 3 for a drive train 10 of a rotary compressor.

Before describing the aspects and embodiments of the present invention, it is to be understood that this invention is not limited to specific systems, methods and/or combinations as described herein, as such aspects and embodiments may, of course, vary. It is also to be understood that specific aspects and embodiments described herein are not intended to be limiting, as the scope of the present invention is limited only by the appended claims. Reference numerals in the present description and in the appended claims are also not to be construed as limiting the scope of the present invention.

The terms "comprise", "comprising", "comprises" as used further are synonymous with "including", "include", "including", or "contain, "containing", "contains", and are inclusive or open-ended, and do not exclude additional, unspecified members, elements, components, and/or method steps. When referring to specific members, elements, components and/or method steps in specific embodiments of the present invention, the possible presence of other members, elements, components and/or method steps is not excluded.

The singular forms "a", "the", "the" comprise both the singular and the plural, unless clearly indicated to the contrary.

Consecutive terms such as "first", "second", "third", etc. are used in the present description and in the appended claims to distinguish between similar elements and not necessarily to describe a sequential or chronological order, unless the contrary is clearly stated. It will be appreciated that these terms are interchangeable under appropriate circumstances and that the embodiments of the invention described herein can operate in other orders than described or illustrated in the present application.

The term "approximately" is used in the present description and in the appended claims to provide flexibility to a numerical range by stipulating that a given value may be "a little above" or "a little below" a stated value or numerical range. For example, when referring to a measurable value such as a parameter, an amount, a duration, etc., it is intended to comprise variations of +/−10% or less, preferably +/−5% or less, more preferably +/−1% or less, and more preferably +/−0.1% or less, of and from the specified value, in so far as the variations are appropriate to function in the invention described herein. It should be understood that the value to which the term "approximately" refers has also been disclosed per se. The listing and/or enumeration of numeric values by a range of numbers comprises all numbers and fractions contained within the associated ranges, as well as the endpoints listed.

The terms "substantial", "essentially" or "almost" refer to the full or nearly complete extent or degree of an action, characteristic, property, state, structure, object and/or result. For example, an object that is "essentially" enclosed means that the object is completely or almost completely enclosed. For example, an object that is "substantially" perpendicular means that the object is completely or almost completely perpendicular to a reference plane. The exact allowable degree of deviation from absolute completeness may, in some cases, depend on the specific context. In general, however, the degree of completion will be such that the overall result is the same as for an absolute and total completion. The use of "essentially" applies equally when used in a negative connotation to refer to the complete or almost complete lack of an action, characteristic, property, state, structure, object, or result. For example, a composition that is "almost free" of particles would be either completely free of particles or almost completely free of particles such that the effect would be the same as if the composition were completely free of particles. In other words, a composition that is "almost free of" an ingredient or element may still contain such ingredient or element if there is no measurable effect thereof.

Relative terms such as "left", "right", "front", "back", "top", "bottom", etc. are used in the present description and in the appended claims for descriptive purposes and not necessarily to describe permanent positions or orientations, depending on the context in which these terms are used. It is understood that the terms used are interchangeable under appropriate circumstances, such that, for example, the embodiments described herein may also be used in positions or orientations other than those shown or described.

The terms "adjacent", "next to" or "against" each other are used in the present description and in the appended claims for descriptive purposes and not necessarily to describe permanent positions, depending on the context in which those terms are used. For example, objects described as "adjacent" to each other may be in physical contact with each other, in close proximity, or in the same general region or area, depending on the context in which the term is used.

In the following passages, various aspects of the invention are further defined. Any aspect so defined may be combined with an other aspect or aspects unless clearly stated to the contrary. In particular, a feature referred to as the "preferred" or "advantageous" may be combined with other features or attributes designated as "preferred" and/or "advantageous". Reference in this specification to "one embodiment" or "an embodiment" means that a particular function, structure or characteristic described in connection with the embodiment is applicable in at least one embodiment of the present invention. When the phrases "in one embodiment" or "an embodiment" are mentioned in different places in this specification, they do not necessarily refer to the same embodiment, although this is not excluded. Furthermore, the disclosed features, structures or characteristics may be combined in any suitable manner, as will be apparent to the skilled person based on this description. The embodiments described and claimed in the appended claims may be used in any combination.

In the present description, reference is made to the accompanying drawings which form a portion thereof and which illustrate specific embodiments of the invention. Numbers in parentheses or in bold linked to certain elements illustrate the relevant elements by way of example, without limiting the elements. It should be understood that other embodiments may be used, and structural or logical changes may be made without departing from the scope of the present invention. The following detailed description is not to be construed as limiting, and the scope of the present invention is defined by the appended claims.

Unless otherwise defined, all terms as used in the present description and in the appended claims, including technical and scientific terms, have the meaning as commonly understood by one of ordinary skill in the art. For further guidance, definitions are incorporated for further explanation of terms used in the description of the invention. All documents cited in the present description are hereby incorporated by reference in their entirety.

In order to meet the above-described needs and shortcomings of the prior art, means have been developed by the inventors for coupling a "driving shaft" or "drive shaft", which is configured to be directly or indirectly driven by a driving element, such as a motor, and a "driven shaft", which is configured for directly or indirectly driving a compression element movably arranged in a, preferably oil-free, compression chamber of the rotary compressor, in particular a rotating tooth or set of teeth.

In particular, the present invention relates to a direct coupling with which a torque with a high power and/or high rotational speed, typical of the operation of a rotary compressor, can be achieved between a drive shaft on the one hand and a driven shaft on the other hand which are arranged abutting, and preferably in line with each other along the drive line axis, in a drive line of this rotary compressor. The direct coupling described herein can significantly improve the lifetime of this drive train, without or with limited maintenance requirements, even in a very hot and/or lubricant-contaminated environment. In addition, the coupling described herein may also allow easier mounting and/or dismounting (i.e. disconnection of the coupled shafts) of this drive train in a blind or difficult-to-access area.

It is a further advantage of the direct coupling described herein that it is suitable for the drive train of an oil-free rotary compressor. Oil-free in the present description refers to the absence of lubrication in the compression chamber. The supplied compressed air purity can be classified into an ISO Class 0-5 by means of ISO standards. ISO Class 1 refers to an oil concentration of at most 0.01 mg/m$^3$ at 1 bar (a) 14.5 psia and 20° C. in the supplied compressed air solution. A compressed air solution that meets the ISO class 1 standards is also called 'technically oil-free'. ISO class 0, on the other hand, refers to 100% oil-free compressed air, i.e. compressed air without traces of oil concentration. A compressed air solution that meets the ISO class 0 standard is also called 'completely oil-free'. The same nomenclature will be used further in the present description.

As will further become apparent from the present description, the direct coupling described herein may also allow integration of a lubricant pump such as an oil pump, which is configured to drive an integrated oil circuit, in the same drive train, preferably in line with the shafts directly coupled together i.e. along the same longitudinal axis of the drive train or "drive line axis". Such integration is usually difficult because the drive shaft of the oil pump requires a smaller outer diameter to avoid the risk of cavitation (i.e. the rotational speed must be limited to reduce the dynamic pressure in the pump) due to the high power and/or rotational speed involved, which is typical for a rotary compressor drive. As will be described further in more detail, it is apparent that in the described direct coupling, advantageously accomplished by means of an applied clamping force, the dimensions of the diameter are advantageously limited, since the diameter of the arranged stud is limited by the maximum outside diameter of the drive shaft at its non-driving end. Obviously, this applied clamping force is determined by the amount of pretension applied to the coupling elements by tensioning the arranged stud coupled between the driven end of the driven shaft and the non-driving end of the drive shaft.

Hereafter, a first overview will be given of various aspects of the invention. This initial overview is intended to aid the reader in a more rapid understanding of the technological concepts described herein, but is not intended to identify their principal or essential features, nor is it intended to limit the scope of the present invention, as it limited only by the appended claims.

The skilled person understands that the aspects described below can be combined in a simpler manner, unless otherwise stated. Also, a specific embodiment of a particular aspect may be interpreted as a specific embodiment of another aspect without separate discussion thereof. For example, an embodiment of the coupling described herein also constitutes an embodiment for the manufacture of such coupling, the use of such coupling, and so forth. The same applies to the advantages of a specific embodiment when integrated in a comprehensive aspect, for example the integration of the coupling described herein in a drive train of a rotary compressor.

FIG. 1 shows an embodiment of a coupling 3 for directly coupling a driven shaft 1 and a drive shaft 2 in a drive train 10 of a rotary compressor. The longitudinal axis of the drive train 10, hereinafter referred to as the drive train shaft 11, is schematically represented by means of a dotted line. The illustrated coupling 3 comprises a coupling hub 31 and a coupling disc 32 which are arranged adjacent to each other, wherein a surface of the coupling hub 31 is arranged against or near an abutting surface of the coupling disc 32. As shown, the coupling hub 31 is arranged over an end of the driven shaft 1, the "driven end", which can be driven by means of this coupling hub 31. The coupling disc 32 is in turn arranged over an abutting end of the drive shaft 2, the "driving end", which can drive this coupling disc 32.

The components of the coupling 3 can be coupled to each other by a clamping force exerted by a stud 4 and associated tensioning element 41 which fixes this stud 4 to the drive shaft 2. As shown, the stud 4 has at least two ends, i.e. a first end which is directly or indirectly coupled or attached to the driven end of the driven shaft 1, and a second end which is directly or indirectly coupled or attached to the drive shaft 2, preferably at a non-driving end of the drive shaft 2 (i.e. an end of the drive shaft 2 which does not drive the coupling disc 32 and therefore not the driven shaft 1—this does not preclude said non-driving end can or will drive any other element).

As further shown in FIG. 1, the drive shaft 2 comprises a hollow passage 21 with an inner diameter suitable for arranging this stud 4. In the illustrated embodiment, the hollow passage 21 extends over the full length of the drive shaft 2, i.e. from the driving end to the non-driving end of the drive shaft 2. The illustrated embodiment has the advantage that it can make the mounting/dismounting of the coupling easier in that the stud 4 and optionally associated tensioning element 41 are easily accessible along the ends of the drive shaft 2. As shown still further in FIG. 1, the stud 4 can be fixed against the non-driving end of the drive shaft 2 by means of a tensioning element 41 which exerts, preferably controllable, a clamping force on the coupling 3. In other words, the tensioning element 41 tightens the stud 4 against the non-driven end of the drive shaft to apply a clamping force to the coupling 3. In other words, the stud 4, which is coupled at an end to the driven shaft as shown, is engaged by means of this tensioning element 41 which tensions another end of the stud 4 directly or indirectly against the non-driving end of the drive shaft 2. In other words, the stud 4 is tensile-loaded by means of this tensioning element 41 along the longitudinal direction of the stud 4, or in other words, by means of this tensioning element 41, a certain pretension is introduced into stud 4, which is transferred via the coupling with the driven shaft 1 on the one hand, and via the tensioning element 41 with the drive shaft 2, to the coupling 3, such that the coupling hub 31 and the coupling disc 32 are forced towards each other along the longitudinal direction of the stud 4. It is thereby clear that the clamping force, generated by the stud 4, is axial and that the stud 4 is axially tensioned, or, in other words along the longitudinal direction of the stud 4, against the non-driven end of the drive shaft 2. In an embodiment, the tensioning element 41 can be arranged around the body of the stud 4, preferably over an end of the stud 4, wherein the relative position of the tensioning element 41 relative to the end of the stud 4 determines the degree of clamping force. To this end, the tensioning element 41 can be tightened over the stud 4 along the drive line shaft 11.

In an embodiment, the tensioning element 41 may contain a nut. To this end, stud 4 may contain an end, which is at least partially provided with an external thread, over which a nut 41, provided with a complementary internal thread, can be tightened. In addition, a lock washer can be added between the nut 41 and the end of the drive shaft 2 to prevent the nut 41 from loosen by vibrations. In an embodiment, the tensioning element 41 may contain a lock nut which is already provided with a locking element, such as a plastic ring incorporated into the lock nut.

Figure 2:
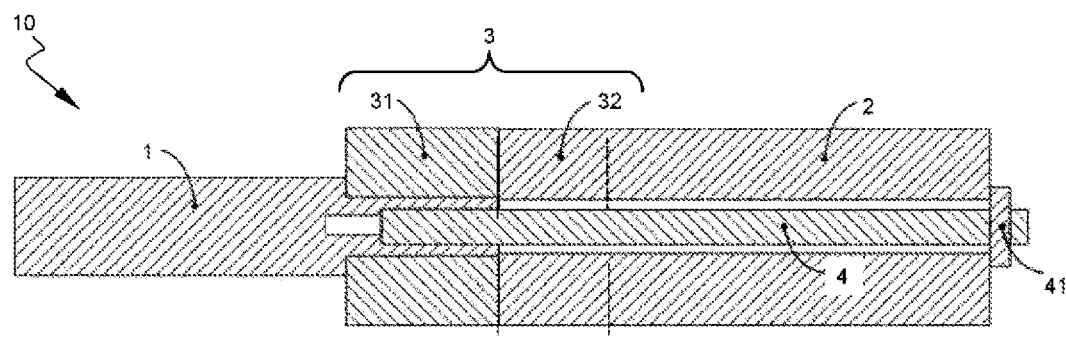
FIG. 2 is a schematic drawing of an alternative embodiment of the coupling 3 for a drive train 10 of a rotary compressor.

FIG. 2 shows an embodiment of a coupling 3 wherein the coupling disk 32 is at least partially integrated into the drive shaft 2 to form an "integrated coupling disk" 32. Specifically, the driving end of the drive shaft 2, which is provided against or near the abutting surface, may provide the function of the coupling disc 32. This embodiment has the advantage that it can simplify the complexity of the drive train 10, but the complete drive shaft 2 must be replaced when worn.

Figure 3:
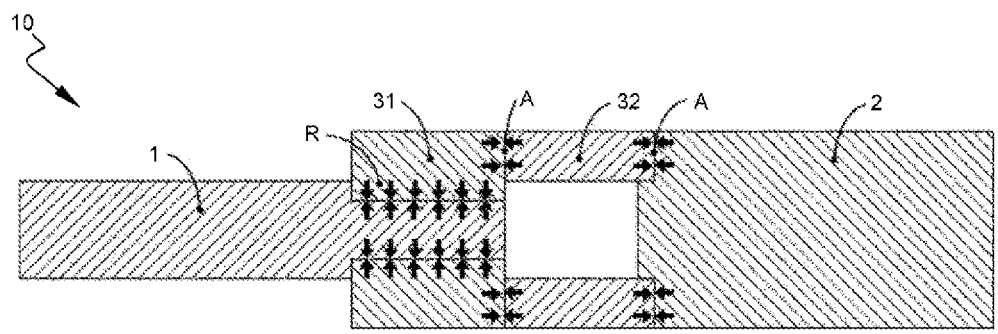
FIG. 3 is a schematic drawing of the clamping forces that can provide torque transfer in an embodiment of the drive train 10.
Figure 4:
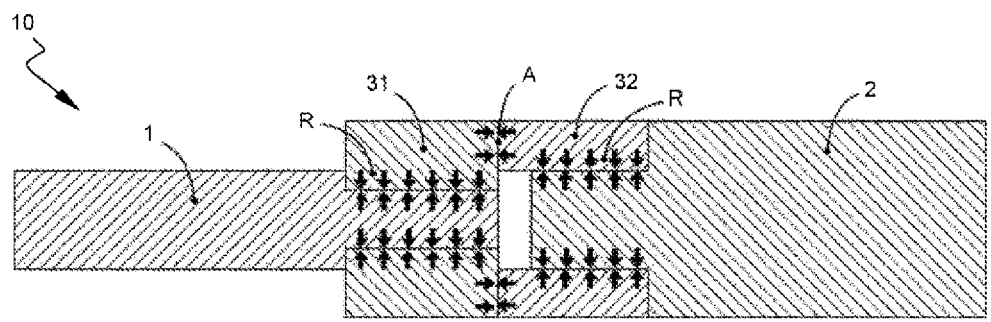
FIG. 4 is a schematic drawing of the clamping forces that can provide torque transmission in an alternate embodiment of the drive train 10.

Fastening the stud 4 to the driven end of the driven shaft 1 on the one hand, and the non-driving end of the driving shaft 2 on the other hand, can create a clamping force in the axial direction (i.e. substantially in the direction of the drive line shaft 11) between the abutting surfaces of the coupling hub 31 and the coupling disk 32. This "axial clamping force" A is schematically represented in FIGS. 3 and 4 by means of arrows pointing towards each other, positioned between the abutting surfaces of the coupling hub 31 and coupling disk 32.

Returning to FIG. 1, an axial pressure force can be applied to the drive shaft 2 by tightening the tensioning element 41, such as a nut, which is arranged on the end of the stud 4. The axial pressure force is then transmitted to the coupling disc 32 which is thereby pushed against the coupling hub 31, in other words, is clamped between the drive shaft 2 and the coupling hub 31 by an axial clamping force A. In other words, in this way it is clear that the elongated stud 4 is configured to clamp the coupling disc 32 to the coupling hub 31. According to the example shown in FIG. 1, this can be achieved, for example, by clamping the coupling disc 32 against the coupling hub 31, however, as further described in more detail, alternative embodiments are possible, wherein, when clamping the coupling disc 32 to the coupling hub 31, one or more suitable elements are present between the coupling disc 32 and the coupling hub 31, such as, for example, a friction disc and/or other suitable elements. When driving the drive shaft 2, loads can be transferred via the coupling disc 32 to the coupling hub 31, which in turn can drive the driven shaft 1, as will be further described below. It is thus understood that the axial clamping force A in the illustrated drive train 10 can provide a torque transmission by means of a friction present between the abutting surfaces of the coupling hub 31 and coupling disc 32. However, because of the achieved peak torque, which will typically be high in a rotary compressor drive with high torque pulsations, it may be advantageous to reduce the magnitude of the required axial clamping force A.

Figure 5:
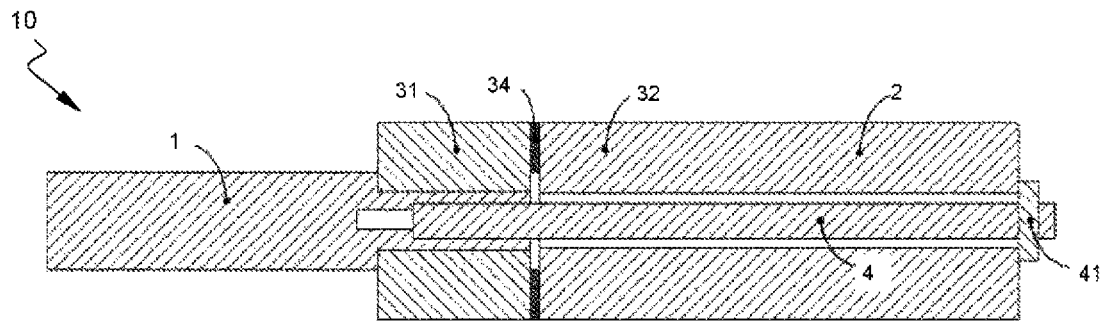
FIG. 5 is a schematic drawing of an embodiment of the coupling 3, wherein a friction disk 34 is arranged between the coupling hub 31 and the coupling disk 32.

FIG. 5 shows an embodiment of a coupling 3 wherein a friction disk 34 is arranged between the surface of the coupling hub 31 and the abutting surface of the coupling disk 32. This friction disk 34 can be configured to increase the coefficient of friction whereby the required clamping force can also be reduced to enable a high torque transfer. In an embodiment, the friction disc 34 may contain granules/crystals bonded in a matrix material, for example coated with diamond granules. These granules then act-under the influence of a sufficiently high surface pressure-on the abutting surfaces of the coupling hub 31 and coupling disc 32. The friction disc 34 preferably increases the coefficient of friction between the abutting surfaces by a factor of 2×, preferably 3×, more preferably 4×, even more preferably 5× or higher. An example of a suitable friction disk 34 is "EKAgrip" (3M) or "DiaNiP-G" (Atela), but another friction disk 34 known in the state of the art is equally suitable.

Figure 6:
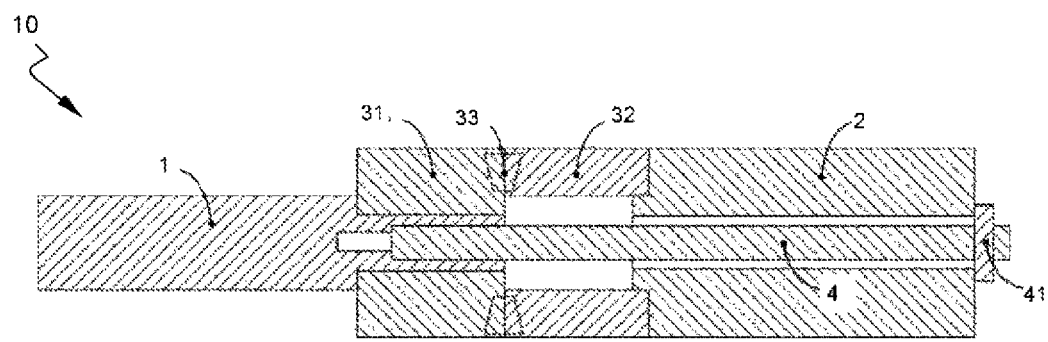
FIG. 6 is a schematic drawing of a preferred embodiment of the coupling 3, wherein a plurality of radial grooves 33 are provided between the coupling hub 31 and the coupling disc 32.

FIG. 6 shows a preferred embodiment of a coupling 3 wherein a surface of the coupling hub 31 and an abutting surface of the coupling disk 32 comprises a plurality of mating radial grooves 33. In an embodiment, the mating radial grooves may contain crown or bevel gears. It is clear that further alternative embodiments are possible, such as, for example, a ball coupling, or another suitable coupling. Providing such radial grooves 33 has the advantage that the required clamping force can be reduced to allow a high torque transfer. For example, the radial grooves 33 may be machined into the surface of the coupling hub 31 and/or coupling disc 32. Preparing radial grooves in the surface is more complex than applying a friction disk 34, described above, but it has the additional advantage that no additional alignment structure has to be provided to limit tolerance build-up in the assembly of the components.

Figure 7:
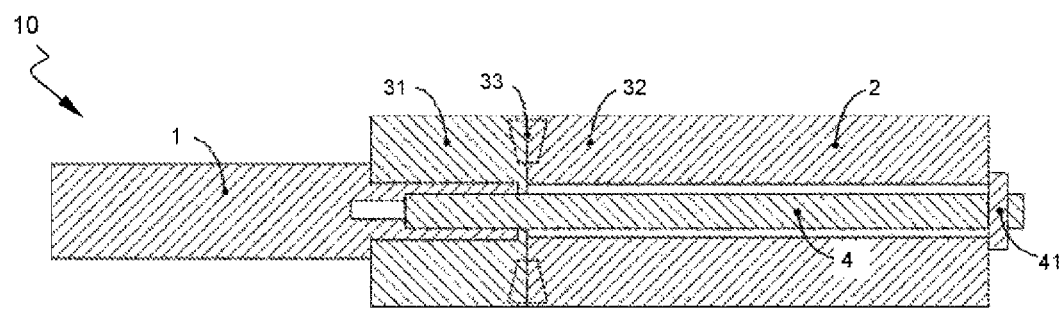
FIG. 7 is a schematic drawing of an alternative embodiment of the coupling 3, wherein a plurality of radial grooves 33 are provided between the coupling hub 31 and the coupling disc 32.

FIG. 7 shows a preferred embodiment of a coupling 3 wherein a surface of the coupling hub 31 and an abutting surface of the drive shaft 2 contain a plurality of mating radial grooves 33, the abutting end of drive shaft 2 hereby performing the function of an "integrated" coupling disc 32. Processing radial grooves into a surface of the drive shaft 2 is admittedly more complex than milling a coupling disc surface, but has the additional advantage that it can accomplish a reduced tolerance build-up in the assembly of the components.

Figure 16:
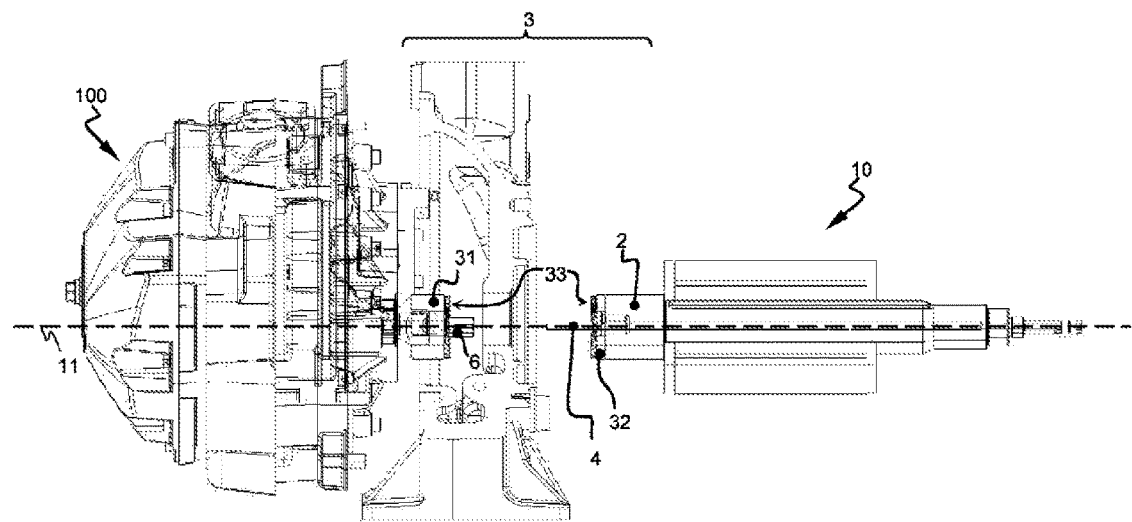
FIG. 16 is an exploded view of a preferred embodiment of the coupling 3 in a drive train 10 of a rotary compressor 100.
Figure 17:
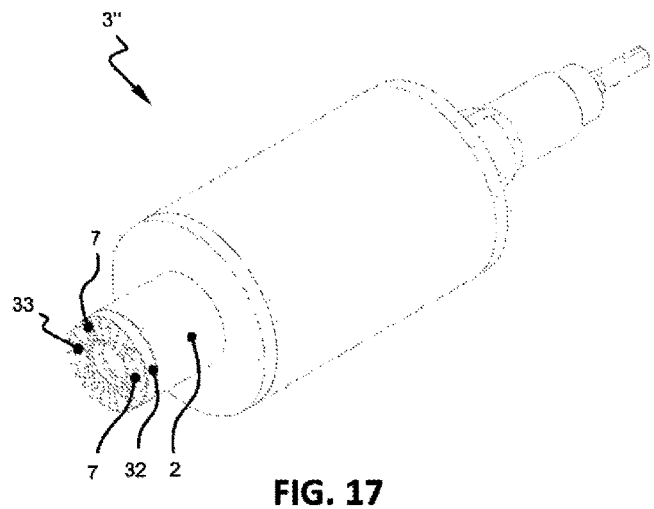
FIG. 17 is a front perspective drawing of a preferred embodiment of the driving portion of a coupling 3".

In a preferred embodiment, the mating radial grooves 33 may be of a Hirth type as known in the state of the art. A Hirth coupling has the additional advantage that it is self-centring and, depending on the embodiment described below, can accomplish a large torque transfer with a limited pretension. An example of a Hirth coupling provided in the abutting surfaces of a coupling hub 31 and coupling disc 32 is shown in FIG. 16. Other examples will be described throughout the text below.

A Hirth coupling usually consists of a plurality of radial teeth formed by grooves milled into the surface of the shaft. The characteristics of the Hirth coupling are largely determined by the number of teeth, as well as by the profile angle of the teeth, measured in relation to the contact surface. The skilled person understands that there is no standardized measurement system with regard to the profile angle of the teeth. Typically, a trade-off can be made between the tooth thickness (strength of the teeth), the angle of the tangential contact surface, the pretension required to transfer torque, and the alignment (alignment force). By way of example, in an extreme case at a profile angle of 0° everything is transferred by axial friction and a very large clamping force will be required, in the other extreme of 90° no clamping force is in fact required. It is understood that, for the embodiments described herein, the appropriate profile angle will be selected between these extreme cases.

In an embodiment, the profile angle of the Hirth coupling is between 45° to 75°, preferably 50° to 70°, more preferably 55° to 65°, even more preferably about 60°, e.g. 59° or 61. The skilled person can select a suitable embodiment of the Hirth coupling on the basis of the parameters discussed above, the preferred values being a preferred embodiment of the Hirth coupling in order to accomplish a greater torque transfer for a more limited pretension.

Figure 13:
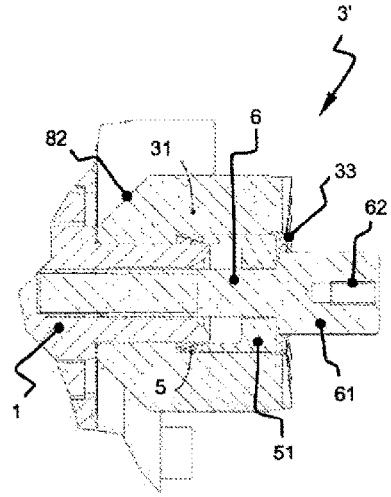
FIG. 13 is a cross-sectional drawing of a preferred embodiment of the driven part of the coupling 3', wherein the driven shaft 1 is clamped in the coupling hub 31 by means of a conical clamp ring 5.

The further torque transfer between the coupled shafts 1, 2 can be accomplished by providing a clamping force between the abutting sides of the driven shaft 1 and the coupling hub 31, respectively, and the drive shaft 2 and the coupling disc 32. Arranging a coupling hub 31 around the driven end of the driven shaft 1 can achieve a clamping force in the radial direction (i.e. substantially perpendicular to the drive line shaft 11) between the abutting surfaces of the driven shaft 1 and the coupling hub 31. This "radial clamping force" R is shown schematically in FIGS. 3 and 4 by means of arrows pointing towards each other, positioned between the abutting surfaces of the driven shaft 1 and the coupling hub 31. In an embodiment, this radial clamping force R can be achieved by pressing the driven shaft 1 into the inner diameter of the coupling hub 31, preferably by press-fitting or shrink-fitting. However, the skilled person understands that other force- or form-fitting connections that are suitably designed for securing a shaft and hub, are equally suitable, assuming that the driven shaft 1 can no longer move relative to the coupling hub 31 after pressing. FIG. 13 shows an example of an embodiment of the coupling 3 wherein the driven shaft 1 is clamped into the coupling hub 31 by means of an press-fitting.

Figure 8:
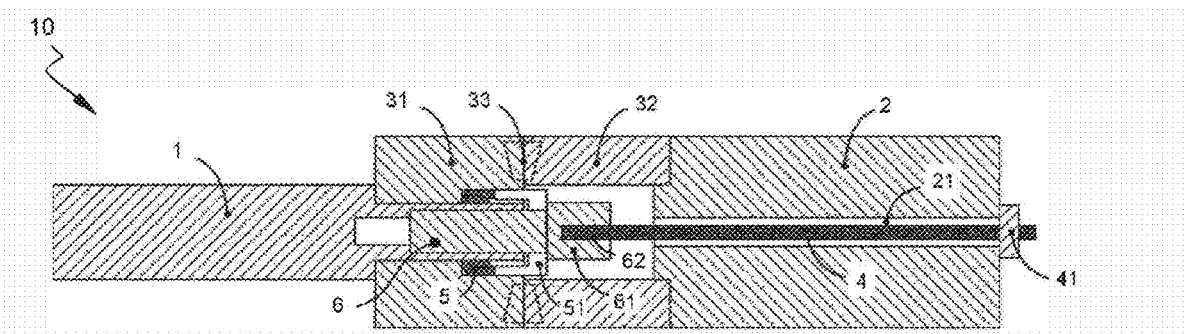
FIG. 8 is a schematic drawing of an embodiment of the coupling 3, wherein the driven shaft 1 is clamped by means of a conical clamping ring 5 and fixed to the stud 4 by means of a pressure ring 51 and fastening part 6.

In an embodiment, this radial clamping force R can be achieved by arranging a conical clamping ring 5 around the driven shaft 1, preferably between the driven end of the driven shaft 1 and the coupling hub 31, the conical clamping ring 5 being configured to clamp the driven shaft 1 to the coupling hub 31 and to drive it when it is driven by a (rotary) movement of the abutting coupling hub 31. In this case, it is clear that the clamping ring 5 is arranged between the driven end of the driven shaft 1 and the coupling hub 31 in a radial direction. FIG. 8 shows an embodiment of a coupling 3 wherein one conical clamping ring 5 is arranged around the driven shaft 1. An advantage of a conical clamping ring 5 is that it can accomplish a large torque transfer between the coupling hub 31 and the driven shaft 1, which is extremely suitable for high torque pulsation, as is common for a rotary compressor. An example of a suitable conical locking element is, for example, known in the prior art and is, for example, marketed under the brand name Ringfeder, as described, for example, at https://www.ringfeder.com/globalassets/downloads/02-product-paper/product-paper-tech-paper-ringfeder-locking-elements-en-08-2019.pdf, and comprises two axially abutting rings that are configured to, when the abutting rings are axially moving towards each other, to achieve an expansion of the diameter of one ring and a compression of the diameter of the other ring, whereby a friction-based coupling can be effected between the shaft and the hub between which the rings of the conical locking element are arranged. Another example of an alternative embodiment of the coupling 3, wherein the driven shaft 1 is also clamped in the coupling hub 31 by means of a conical clamping ring 5, is shown in FIG. 13.

Figure 9:
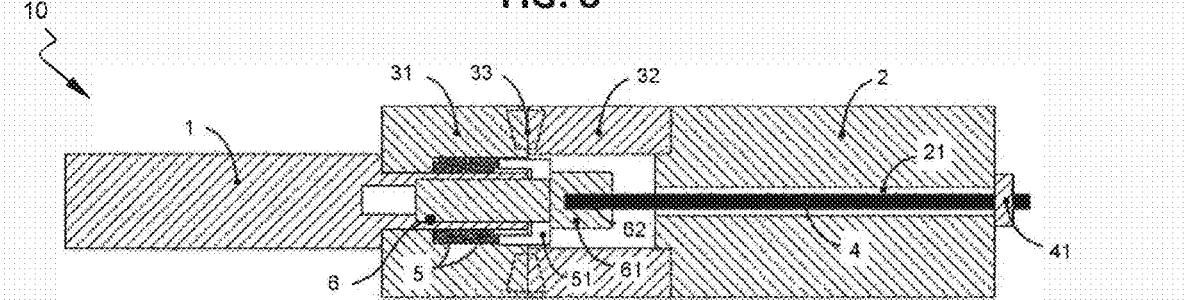
FIG. 9 is a schematic drawing of an embodiment of the coupling 3, wherein the driven shaft is further clamped by means of a plurality of conical clamping rings 5.
Figure 14:
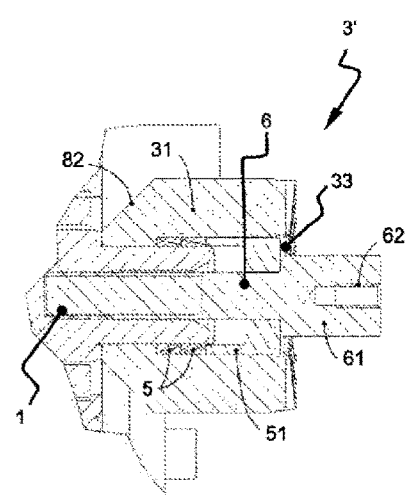
FIG. 14 is a cross-sectional drawing of a preferred embodiment of the driven portion of the coupling 3', wherein the driven shaft 1 is clamped in the coupling hub 31 by a plurality of conical clamping rings 5.

FIG. 9 further shows an embodiment of a coupling 3 wherein a plurality of conical clamping rings 5 are arranged successively around the driven shaft 1. Specifically, in this figure, two successive conical clamping rings 5 are shown, but it is understood that the number of conical clamping rings shown is only illustrative and a higher number, for example three or four conical clamping rings 5, is equally suitable. The suitable amount depends, among other things, on the length of coupling hub 31 and the required torque power, as well as the desired complexity of the drive shaft. The skilled person will appreciate that the number of conical clamping rings 5 is preferably not chosen too high in favour of simpler mounting and maintenance of the drive shaft. FIG. 14 shows another example of an alternative embodiment of the coupling 3 wherein the driven shaft 1 is also clamped in the coupling hub 31 by means of a plurality of conical clamping rings 5.

The pretension that is required to lock the one or more conical clamping rings 5 as discussed above, or in other words, to generate the clamping force for clamping the coupling hub 31 to the driven shaft 1, may be higher than can safely be applied onto the stud 4. For this purpose, between the driven shaft 1 and the stud 4, i.e. along the axial direction or in other words, the longitudinal direction of the stud 4, preferably between the one or more conical clamping rings 5 and the stud 4, a pressure ring 51 and a fastening part 6 can be arranged. The fastening part 6 is thereby configured, as shown, to apply the pretension to the clamping rings via the pressure ring 51, and, in other words, the pretension for applying this clamping force to the clamping rings 5 is provided by a tensile stress that is applied to and absorbed by this fastening part 6. Therefore, this pretension for the clamping rings 5 does not have to, or does not longer have to be supplied completely, by the stud 4, which is still subjected to tensile load in order to generate the clamping force between coupling disc 32 and coupling hub 31. In other words, such an embodiment with the fastening part 6 allows to absorb the pretension for generating the clamping force in the clamping rings 5 with the fastening part 6 or to distribute it over the fastening part 6 and the stud 4. An example of a suitable pressure ring 51 is a roundel, also called ring or washer, having an opening configured to insert a tap end of the fastening part 6 and to abut against the bolt head 61 of the fastening part 6 and configured to transfer the pressure force generated by the bolt head 61 towards the clamping rings 5. Preferably, a suitable pressure ring 51 also allows to absorb the clearance when pressing the clamping rings 5, as well as distributing the tension over the surface of the clamping rings 5. It is clear that further alternative embodiments are possible, wherein, for example, the fastening part 6 and the stud 4 are formed as one unit, or in other words, wherein the stud 4 comprises a part, preferably having a larger diameter, which functions as a fastening part 6 configured to absorb at least part of the tension generated when the one or more clamping rings 5 is tightened and wherein the thinner portion of the stud 4 is then used similarly as described above for axially clamping the coupling disc with the coupling hub.

According to the exemplary embodiments shown in, for example, FIGS. 8 to 11, between the driven end of the driven shaft 1 and the stud 4, a fastening part 6 is arranged, which has a larger diameter than the stud 4 and is configured to connect the stud 4 to the driven shaft 1. In an embodiment, the end of the stud 4 at the driven shaft 1 may be provided with an external thread and the fastening part 6 may contain an opening 62 provided with a complementary internal thread along which the stud 4 can be screwed in.

According to such embodiments, the fastening part 6, as shown, comprise, for example, a bolt, preferably having a bolt head 61 with an opening 62 into which an end of the stud 4 can be screwed in and a tap end which can be screwed into a corresponding opening in the driven shaft 1, in particular provided in the abutting surface of the driven shaft 1. In this way, the bolt can couple the stud 4 to the driven shaft 1 in the longitudinal direction. The skilled person understands that variants of this are equally suitable, for example wherein the bolt 6 can be screwed into the stud 4, or the driven end of the driven shaft 1 can be screwed into the bolt 6. However, screwing the stud 4 into the bolt 6 has the advantage that it can simplify the mounting and dismounting compared to the alternative embodiments.

FIG. 8 shows an embodiment of a coupling 3 wherein the stud 4 is coupled to the driven shaft 1 by means of a bolt 6, or in other words, fastened. Specifically, the stud 4 is arranged in an opening 62 provided in the bolt head 61. FIG. 8 further shows that a pressure washer 51 is arranged over the bolt 6, in particular between the bolt head 61 and the conical clamping ring 5.

As explained above, the coupling disc 32 may be integrated directly into the drive shaft 2 or alternatively be provided as a separate component which is secured to the drive shaft 2 with a tensioning element to effect torque transfer. In the second case, a clamping force in a radial and/or axial direction can be provided between the abutting surfaces of the drive shaft 2 and the coupling disc 32, depending on the embodiment of the coupling 3. Hereafter, some suitable examples will be explained in more detail.

As shown in FIG. 3, an axial surface of the driving end of the drive shaft 2 (i.e. an end face of the drive shaft 2 in the direction of the drive train shaft 11) may be arranged against an abutting surface of the coupling disk 32. Fastening the driving end of the drive shaft 2 and the coupling disk 32 can accomplish a clamping force in the axial direction between the abutting surfaces of the driven shaft and the coupling hub 31. This "axial clamping force" A is schematically represented in FIG. 3 by means of arrows pointing to each other, positioned between the drive shaft 2 and the coupling disc 32.

Figure 10:
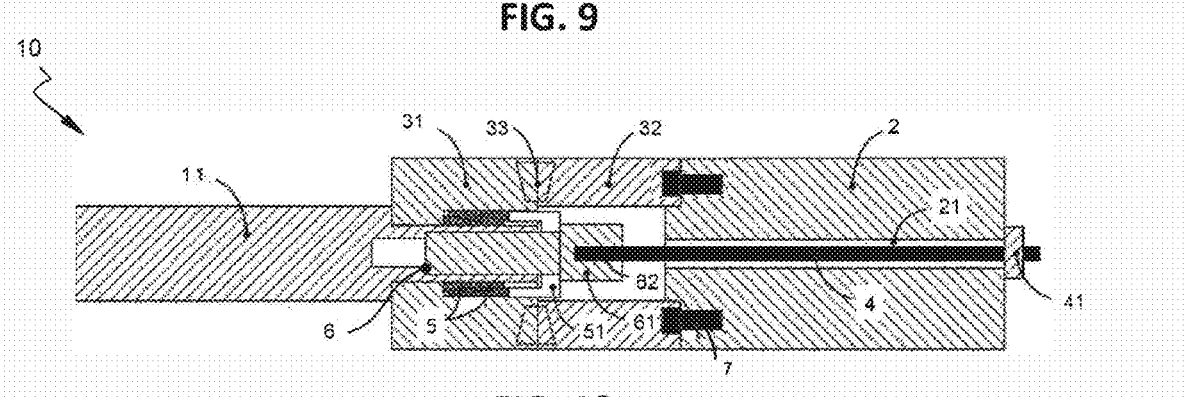
FIG. 10 is a schematic drawing of an embodiment of the coupling 3, wherein the drive shaft 2 is further attached to the coupling disc 32 by means of fastening elements 7.

FIG. 10 shows an embodiment of a coupling 3 wherein the coupling disc 32 is fastened to the drive shaft 2 by means of several fastening elements 7. Specifically, two fastening elements 7 are shown in this figure, but the skilled person understands that the number shown is illustrative only and another number is equally suitable, e.g. one, four, eight, etc. fastening elements 7, depending on the desired complexity and simplicity of assembling the drive train 10. It is thereby clear that a suitable number of fastening elements is preferably high enough to guarantee the desired axial clamping force between the coupling 3 and the coupling disk 32, and is preferably low enough to reduce the contact surface of, for example, radial grooves in the coupling disc 32 as little as possible, for example as a result of openings provided in this contact surface for mounting the fastening elements 7.

Figure 18:
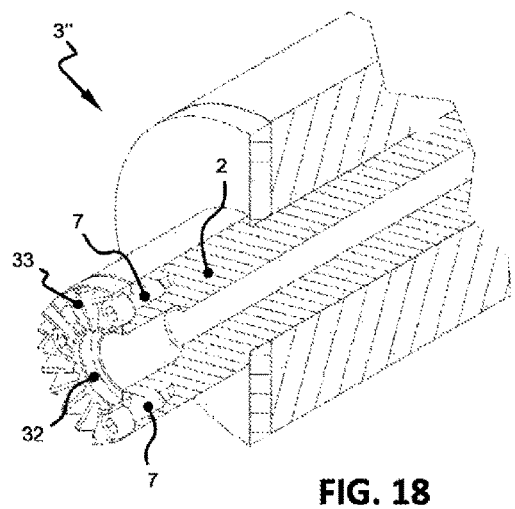
FIG. 18 is a cross-sectional perspective view of a preferred embodiment of the driving portion of a coupling 3".
Figure 19:
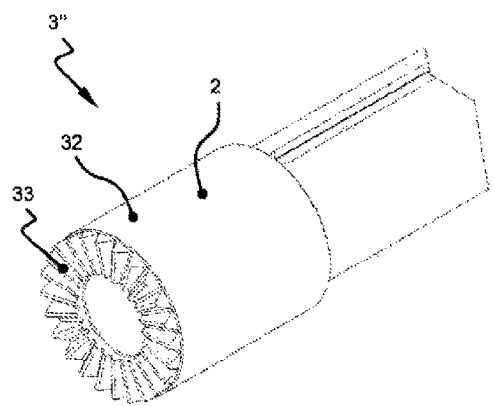
FIG. 19 is a side perspective drawing of a preferred embodiment of the driving part of a coupling 3".

In an embodiment, the fastening element 7 comprises a bolt, preferably with a bolt head and a tap end, which can be screwed into a corresponding opening in the drive shaft 2, in particular provided in the abutting surface of the drive shaft 2. In this way, the bolt 7 can couple the coupling disc 32 to the drive shaft 2 in the longitudinal direction. The skilled person understands that variants thereof are equally suitable, for example, wherein the bolt 7 can be screwed into the coupling disc 32. However, screwing the bolt into the drive shaft 2 has the advantage that it can simplify the mounting and dismounting compared to the alternative embodiments. FIG. 18 shows an example of an embodiment wherein a coupling disc 32 is fastened to the drive shaft 2 by means of four bolts 7. FIG. 18 further shows how these bolts 7 are arranged in the driving end of the drive shaft 2.

As shown in FIG. 4, a radial surface of the driving end of the drive shaft 2 can be arranged against an abutting surface of the coupling disc 32, in particular wherein this drive shaft 2 has an elongated driving end with a narrower diameter and wherein the coupling disc 32 is arranged around this driving end of the drive shaft 2. In such an embodiment, equivalent to the aforementioned connection between the drive shaft 1 and the coupling hub 31, a "radial clamping force" R can be achieved between the abutting surfaces of the drive shaft 2 and coupling disc 32. The skilled person is believed to be able to transfer the above-described embodiments for coupling the driven shaft 1 and the coupling hub 31 to an equivalent coupling of the drive shaft 2 to the coupling disc 32.

A further aspect of the present invention relates to a drive train 10 which comprises the coupling 3 described herein, and/or a rotary compressor 100 which comprises the coupling 3 described herein. In particular, the present invention relates to a rotary compressor 100 containing a drive train 10 wherein a drive shaft 2 and a driven shaft 1 are preferably directly coupled to each other by means of the coupling 3, described herein, and are preferably arranged in line with each other, i.e. along the drive train shaft 11. It is understood that the preferred embodiments of the coupling 3, described herein, also constitute preferred embodiments of the drive train 10 and/or rotary compressor 100.

In an embodiment, the rotary compressor 100 may contain a driving element, specifically a motor capable of generating a torque suitable to drive the drive train 10, described herein, and a drive shaft 2 that can be driven by the driving element. In a preferred embodiment, the driving element may contain an electric motor because such a type of motor is usually capable of achieving a sufficiently high power and/or high rotational speed as required to drive a rotary compressor. The skilled person will appreciate that the coupling 3, described herein, is not limited to a specific embodiment of the driving element.

In an embodiment, the rotary compressor may contain a, preferably oil-free, compression chamber and a compression element movably arranged in the compression chamber, in particular a tooth or set of teeth, which is driven by the driven shaft 1. It is understood that the compression element herein forms a driven element, such that the rotary compressor comprises a driven element, which can be driven directly by means of the drive line by the driving element, described above. The skilled person can appreciate that the compressor, described herein, is not limited to a specific embodiment of the compression element, in particular the tooth, but in principle any type of tooth as known in the prior art can be considered as suitable, for example, with the known variations in shape, geometry, size, and so on.

In an embodiment, the rotary compressor may contain a lubricant circuit configured to supply lubricant to components of the rotary compressor, particularly the drive train, which may require lubrication. The rotary compressor may further contain a lubricant pump, such as an oil pump, known in the prior art, configured to generate the required pressure at the lubricant circuit. The skilled person understands that oil or a liquid mix containing oil is typically used as a lubricant in rotary compressors, but in principle other types of lubricant, known in the prior art, can be used.

The lubricant circuit, preferably oil circuit, is understood to contain all components necessary to ensure proper lubricant delivery to those components of the drive train that may require lubrication i.e. including all associated channels and components in the rotary compressor. For example, an oil circuit usually contains an oil pan 97 for oil storage and an oil filter 96 for removing contaminants from the oil flowing therethrough. In the interest of brevity, the other components will not be described separately, but the skilled person will understand that an oil circuit usually also contains seals, filters, plugs, drains, and so forth. In an embodiment, the lubricant circuit may comprise a lubricant injector 8, which is configured to deliver lubricant to components of the coupling 3 that may require lubrication. To this end, the lubricant injector 8 may contain an injection nozzle 81 which injects the lubricant under the required pressure as a liquid jet onto said components of the coupling 3. It is an advantage that the injector nozzle 81 is directed to said components. In another embodiment, the injector nozzle 81 may be directed to a component of the coupling 3 along which the injected lubricant is passed to the components of the coupling 3 which may require lubrication, for example by diffusing and/or bouncing the injected jet. To this end, the coupling 3 can be provided with a bevelled side 82 with a bevelled side which directs injected lubricant to a part of the coupling 3 that requires lubrication; preferably promotes the distribution of the supplied, preferably injected, lubricant.

Figure 15A:
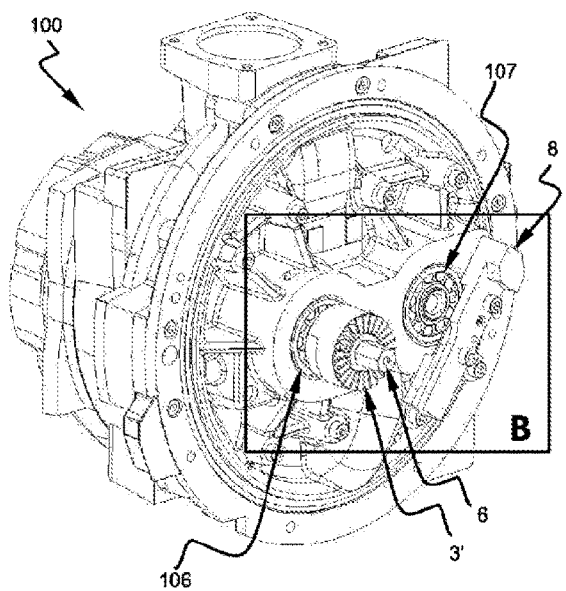
Figure 15B:
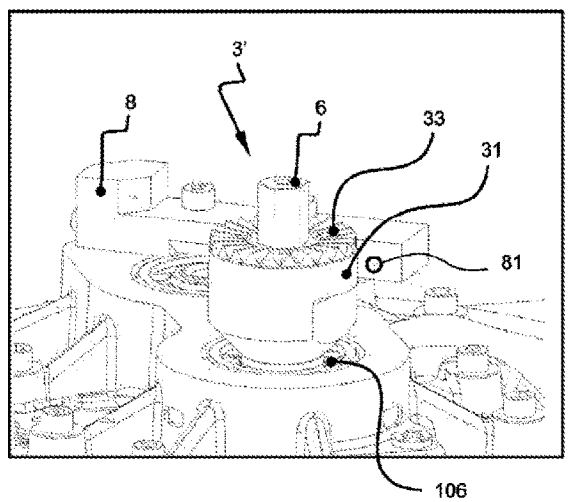
FIG. 15B shows a detail view of the driven portion of the coupling 3'.

FIG. 15A shows an embodiment of a lubricant injector 8 arranged along the coupling hub 31. FIG. 15B further shows that the lubricant injector 8 comprises an injector nozzle 81 which is oriented at an injection angle of approximately 90 degrees with respect to the drive train shaft 11. This allows the injector nozzle 81 to inject the lubricant directly onto a side face of the coupling hub 31 to lubricate components of the driven portion 3' of the coupling, such as a bearing 106 mounted around the driven shaft 1.

Figure 20:
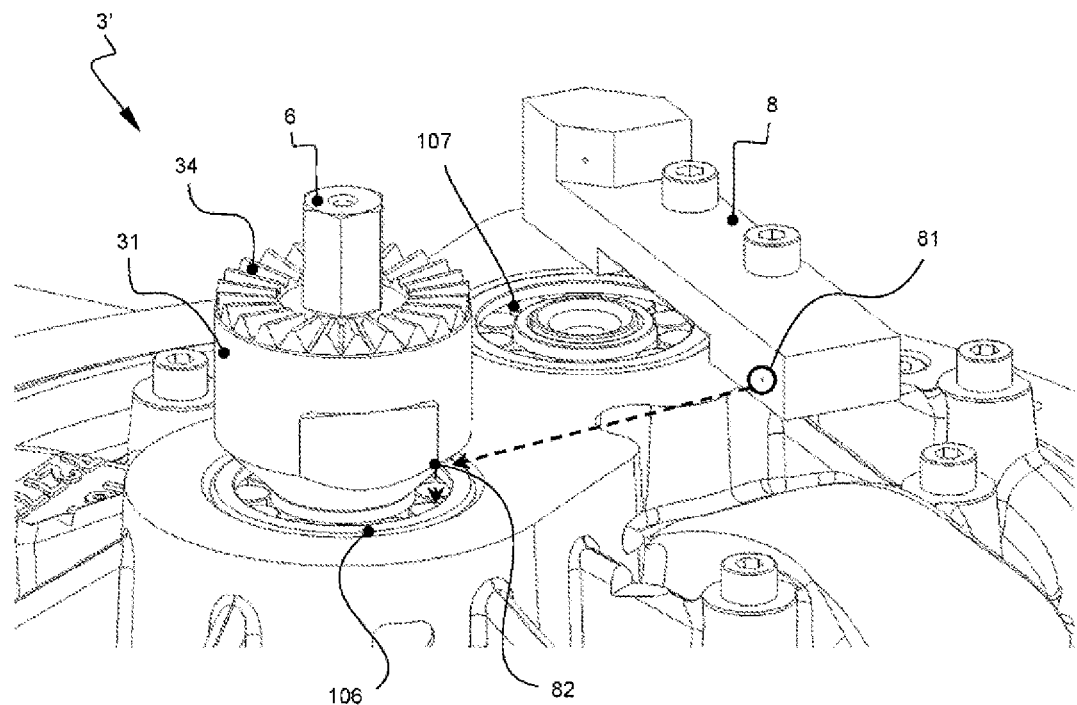
FIG. 20 is a side perspective drawing of the lubricant injector 8 in an embodiment of the driven portion 3' of the compressor 100.

To further explain the operation of the lubricant injector 8, reference is made to FIG. 20, which shows a detail view of the embodiment of FIG. 15A, wherein the flow of the injected lubricant is schematically indicated by means of a dotted line. Specifically, a liquid flow consisting of or containing lubricant can be sprayed from the injector nozzle 81 toward a bevel 82 provided on a side face of the coupling hub 31, which reflects the liquid flow at a substantially right angle toward the adjacent conical clamp ring 5.

The skilled person understands that the bevel angle, defined as the angle of the surface of the bevel edge 82 with respect to the drive line shaft 11, should be adapted to the position of the lubricant injector 8, in particular the injection angle of the injector nozzle 81, with respect to the position of a component of the coupling 3 that may require lubrication, such as, for example, a bearing 106. In an embodiment, the bevel 82 has a bevel angle of 80° to 10° with respect to the drive train shaft 11, preferably 70° to 20°, more preferably 60° to 30°, even more preferably 55° to 35°, even more preferably 50° to 40°, even more preferably substantially 45°, for example 44° or 46°. In order to assist the skilled person in choosing a suitable bevel angle, an exemplary embodiment will be discussed in more detail below.

Figure 21:
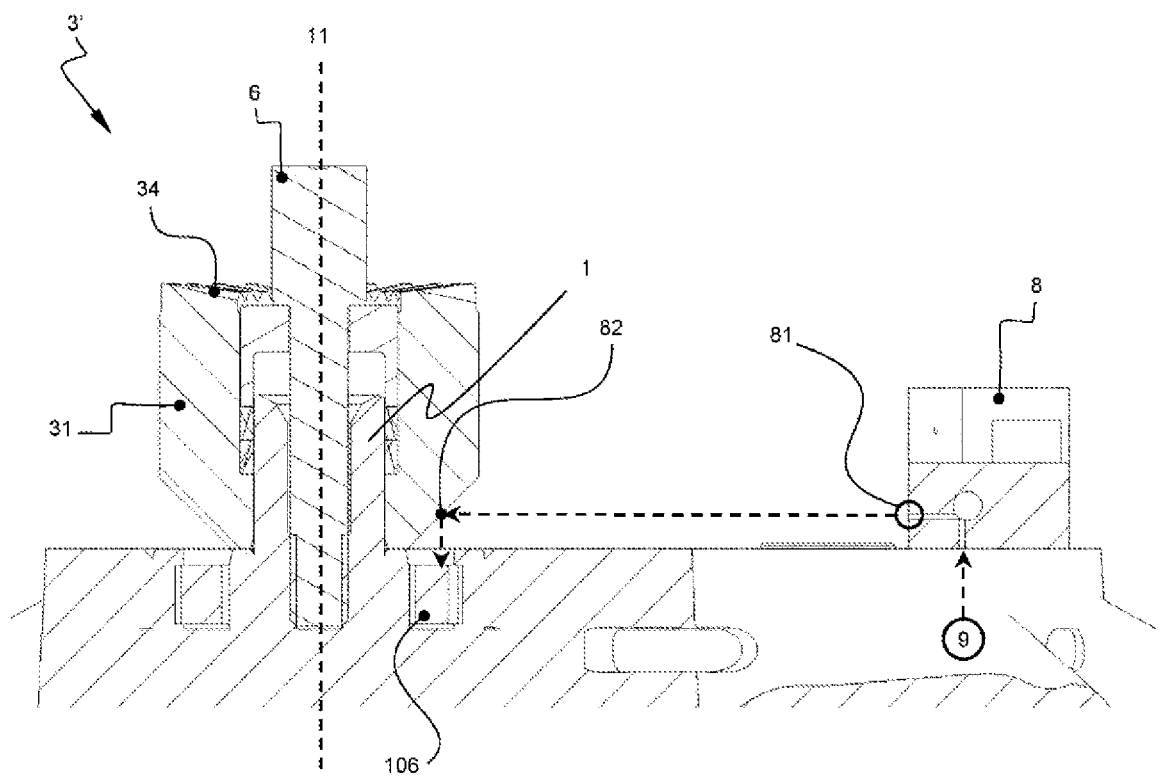
FIG. 21 is a cross-sectional drawing of the lubricant injector 8 in an embodiment of the driven portion 3' of the compressor 100.

As further shown in FIG. 21, which shows a cross-sectional drawing of FIG. 20, the lubricant may be supplied by a lubricant circuit which is driven by a lubricant pump 9. FIG. 21 shows that the lubricant is injected at an injection angle of 90° to the drive line shaft 11 onto a bevel 82 arranged on a side face of the coupling hub 31. This bevel 82 has a bevel angle of 45° relative to the drive train shaft 11, whereby the injected lubricant moves towards a bearing 106 positioned along the drive train shaft 11. The rotation of the coupling hub 31 and the bearing 106 arranged around the drive shaft 1 will ensure that virtually every part of the bearing 106 can be lubricated.

As already mentioned above, the drive train 10, described herein, can further provide the possibility of directly connecting a lubricant pump 9 to the same drive shaft 2, or an extension thereof, such that a lubricant circuit driven by this lubricant pump 9 can be driven by the same drive shaft 2, as the coupling 3 described herein. In an embodiment, the lubricant pump 9 can be arranged along the same drive line shaft 11 as the coupled shafts 1,2, preferably in line with the drive shaft 2, and thus also in line with the coupling 3 described herein. It is understood that the direct connection of the lubricant pump 9 to the drive train 10 constitutes an "integrated lubricant pump", as distinguished from an externally driven oil pump i.e. an oil pump which is driven by an external drive.

Figure 11:
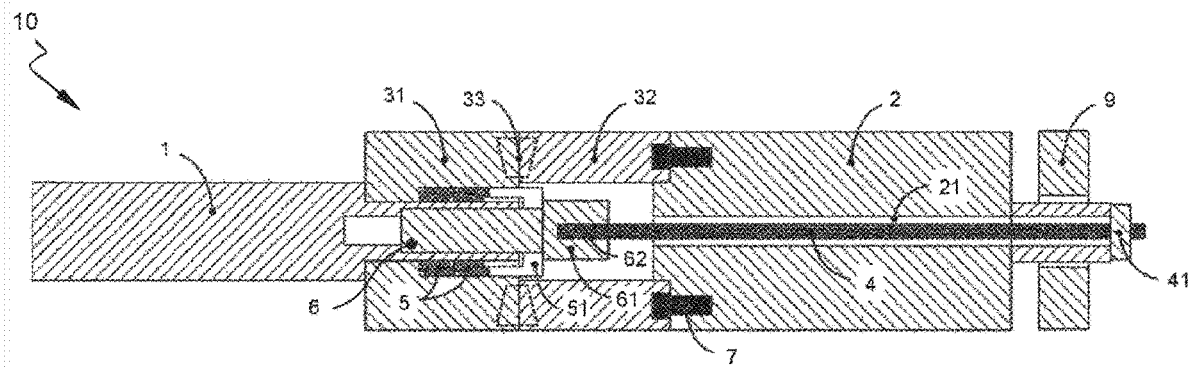
FIG. 11 is a schematic drawing of a preferred embodiment of the coupling 3, wherein the stud 4 is further connected to a lubricant pump 9.
Figure 12:
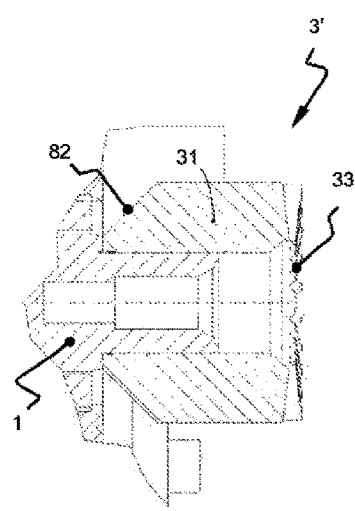
FIG. 12 is a cross-sectional drawing of an embodiment of the driven part of a coupling 3', wherein the driven shaft 1 is press-fitted into the coupling hub 31.

FIG. 11 shows a preferred embodiment of a coupling 3 wherein a lubricant pump 9 is arranged adjacent to the non-driving end of the drive shaft 2. In the illustrated embodiment, the drive shaft 2 has an extended end with a narrower diameter and the lubricant pump 9 is arranged around this extended end of the drive shaft 2. The skilled person understand that the extended end may also be a stand-alone component coupled or attached to the non-driving end of the drive shaft 2, or alternatively may be a component of the lubricant pump 9. However, the illustrated embodiment has the advantage of allowing a more robust coupling.

As further illustrated, the hollow passage 21 extends over the full length of the drive shaft 2, i.e. from the driving end of the drive shaft 2 to the non-driving end over or against which the lubricant pump 9 is arranged. The second end of the stud 4, i.e. the end facing the non-driving end of the drive shaft 2, can, equivalent to the embodiments described above, be fastened with a tensioning element 41, such as a nut, to the non-driving end of the drive shaft 2. Preferably, it only clamps onto the non-driving end of the drive shaft 2 and does not make direct contact with the lubricant pump 9 as to not impede its operation.

FIG. 22A shows an embodiment of a rotary compressor 100 with the preferred embodiment of FIG. 11, in particular a coupling 3 with an integrated oil pump 9. FIG. 22B shows this coupling 3 up close and FIG. 22C further shows the connection of the oil pump 9 to the stud 4. Further, FIG. 22A shows a number of components of the oil circuit that can be driven by the oil pump 9, such as an oil pan 97 and an oil filter 96.

FIG. 23A also shows an embodiment of a rotary compressor 100 with the preferred embodiment of FIG. 11, in particular the coupling 3 with an integrated oil pump 9. FIG. 23B subsequently shows the coupling 3 up close, and FIG. 23C further shows the connection of the oil pump 9 to the stud 4.

Figure 24A:
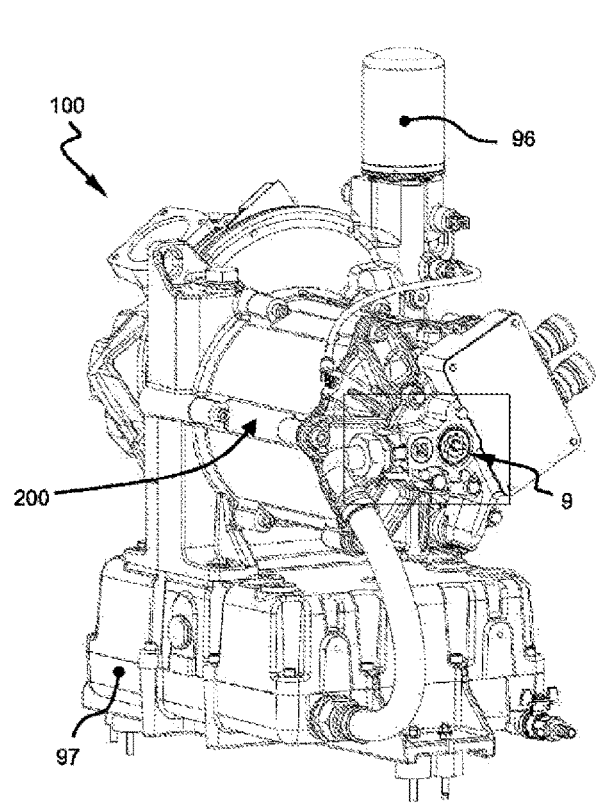
Figure 24B:
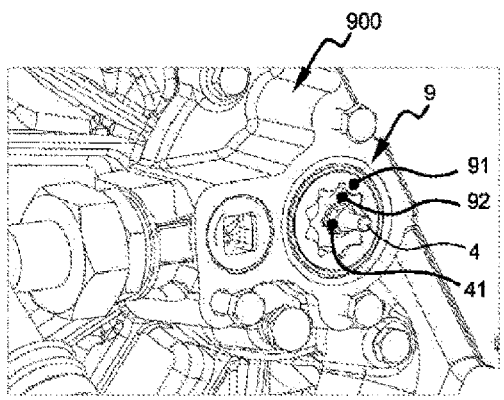
FIG. 24B shows a detail perspective view of the lubricant pump 9 and FIG. 24C shows a detail view of the lubricant pump 9 in front view.
Figure 24C:
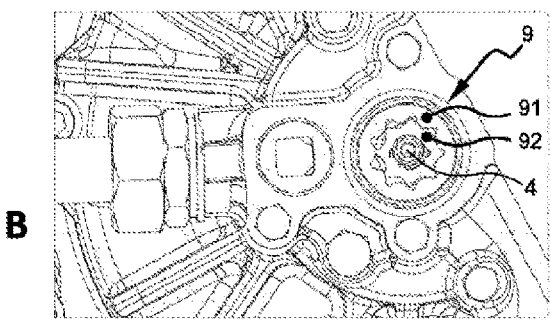

In an embodiment, for example, as illustrated in FIGS. 24B, 24C, the lubricant pump 9 may contain an outer rotor 91 and an inner rotor 92, rotatably arranged in the outer rotor 91, wherein the inner rotor 92 is configured to rotate relative to the outer rotor 91 to generate the required flow rate to drive the lubricant circuit. In a preferred embodiment, the lubricant pump 9 comprises a gerotor pump as known in the prior art. An example of a suitable gerotor is a trochoid pump wherein the profile of the inner rotor 92 has a trochoidal profile shape, preferably generated as the equidistant of the epitrochoidal profile as determined by the profile of the outer rotor 91, such that the outer rotor 91 and inner rotor 92 have complementary trochoidal profile shapes. The skilled person will appreciate that the gerotor, described herein, is not limited to a specific embodiment of the outer rotor 91 and/or inner rotor 92, but in principle any type of rotor, preferably with a trochoidal profile shape, as known in the art can be considered as suitable.

FIG. 24A shows an embodiment of a rotary compressor 100 with the preferred embodiment of FIG. 11, in particular the coupling 3 with an integrated oil pump 9, wherein this oil pump 9 comprises a gerotor. As shown in more detail in FIG. 24B, the oil pump comprises an outer rotor 91 and an inner rotor 92 arranged around the drive shaft 2 in such a way that an end of the stud 4 passes through the centre of this oil pump 9. Abutting the oil pump 9, a tensioning element 41 is arranged over the stud 4, which exerts a clamping force on the coupling 3, as discussed above. The tensioning element 41 preferably clamps only on the end of the drive shaft 2 and therefore does not make direct contact with the lubricant pump 9, as not to impede its operation. FIG. 24C subsequently shows up close the complementary trochoidal profile shapes of the outer rotor 91 and the inner rotor 92.

In an embodiment, the lubricant pump 9 may be connected to the drive shaft by means of a mechanical connection. To this end, for example, a recess can be provided in the lubricant pump 9 which is configured to connect with a corresponding protrusion or stopper provided in the drive shaft 2, or vice versa.

Figure 25:
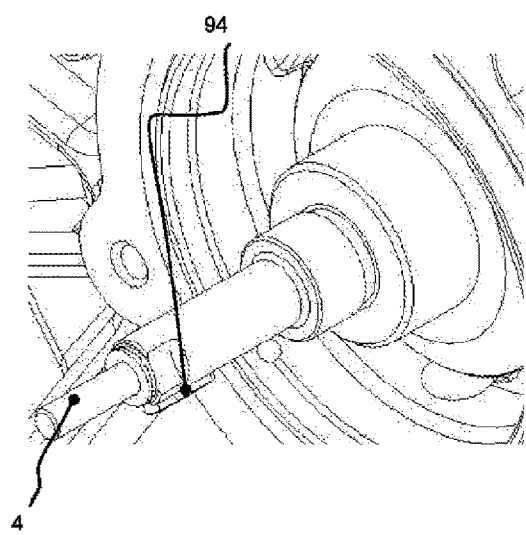
FIG. 25 is a schematic perspective view of an embodiment of a connection for the lubricant pump 9, wherein the drive shaft 2 comprises a keyway 94.
Figure 26:
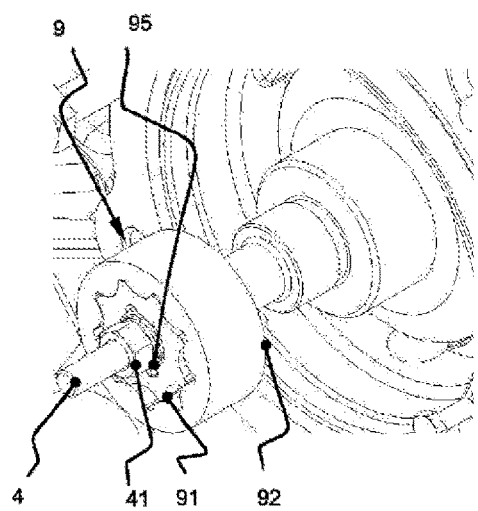
FIG. 26 is a schematic perspective view of an embodiment of the lubricant pump connection, wherein the lubricant pump 9 is keyed to the drive shaft 2 by means of a key.
Figure 27:
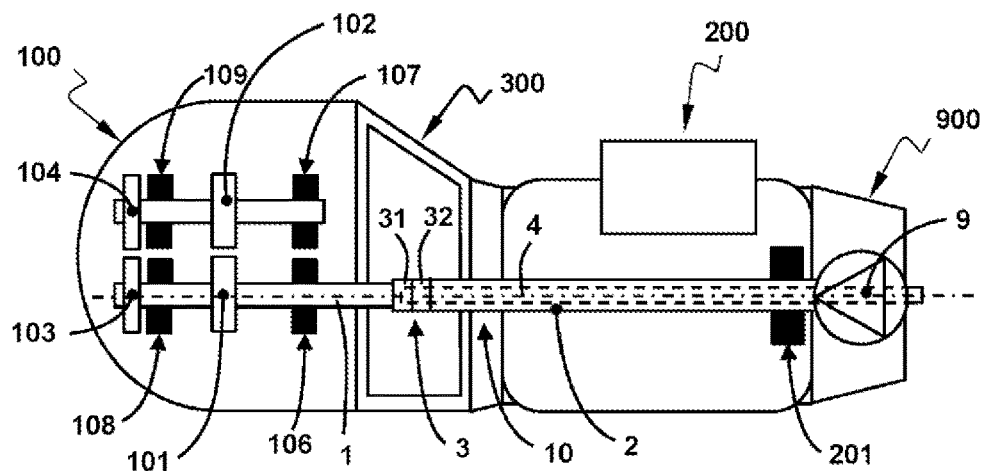
FIG. 27 is a schematic representation of an embodiment of an assembly having a coupling 3 similar to the preceding Figures.

FIG. 25 shows an embodiment of a suitable lubricant pump connection wherein an end of the drive shaft 2 comprises a keyway 94. FIG. 26 subsequently shows how a lubricant pump 9 on the embodiment of FIG. 25 can be connected by means of a key 95 provided in this keyway 94, which is configured to connect to a corresponding recess in the lubricant pump 9. This key 95 can be arranged by means of this connection directly drive the rotation of the inner rotor 92 upon rotation of the drive shaft 2. The skilled person will appreciate that the keyway 94 and key 95 can be replaced in a simple manner by means of a projection or stopper protruding from the end of the drive shaft 2, for example a D-shaped projection. FIG. 27 schematically illustrates an embodiment of an assembly containing an oil-free rotary compressor 100 using a coupling 3 similar to that described above, to couple the rotary compressor 100 to a motor 200. Furthermore, as shown, this assembly also comprises a lubrication pump 9, which, similarly as described above, is connected to the drive shaft 2. Similar elements have been designated by similar references and function in a similar manner as described above. As shown, the coupling 3 for the drive train 10 allows the drive shaft 1 and the drive shaft 2 to be coupled axially in line by means of a rigid connection, and, in other words, in the coupled state, behave as a one-piece drive shaft. This allows to support the drive shaft 2 on the side of the motor 200 with only one bearing 201, since according to the axial direction, as shown, the drive shaft 10 on the side of the rotary compressor 100 is already journaled. According to the exemplary embodiment shown, the drive shaft 10 is journaled on the side of the rotary compressor 100 by means of two bearings 106, 108, which are arranged axially on either side of a compressor element 101. However, it is understood that alternative embodiments are possible, wherein a different number or positioning of the bearings in the rotary compressor 100 is possible, wherein at least one bearing 106 is arranged on the axially opposite side of the coupling 3 on the driven shaft 1.

It is further clear that the schematically illustrated bearings herein bear the rotating components, such as the drive shaft 10, in one or more housings of the assembly. According to the exemplary embodiment shown, the housing of the assembly comprises a plurality of sub-housings arranged together. Thus, according to the exemplary embodiment shown, along the axial direction of the drive shaft, a housing of the rotary compressor 100 is arranged to a housing 300 of the coupling 3, which is then arranged to a housing of the motor 200, which in turn is arranged to a housing 900 of the lubricant pump 9.

In the illustrated embodiment, there is shown a rotary compressor 100 similar to those known, for example, as oil-free rotary tooth compressors marketed by Atlas Copco under the trade names ZT 15-22, ZR/ZT 30-45, ZT 22 VSD, ZR/ZT 37-55 VSD, and, for example, described in more detail in https://www.atlascopco.com/content/dam/atlas-copco/local-countries/belgium/documents/oil-free-air/Olievrije-tandrotor-compressoren-ZT-15-22-en-ZR_ZT-30-45-en-ZT-22-VSD-en-ZR_ZT-37-55-VSD.pdf. Such a rotor contains two compressor elements 101, 102 configured to rotate close to each other to compress a gas. As shown, the first compressor element 101 is arranged on the driven shaft 1 which is journaled by means of two bearings 106, 108 in the housing of the rotary compressor 100 and which is provided with a timing gear 103. The second compressor element 102 is provided to cooperate with the first compressor element 101, on an axis parallel to the driven shaft 1 and which is also journaled by two bearings 107, 109 on either side of the compressor element 102 and provided with a timing gear 104. The timing gear 104 of the shaft of the second compressor element 102 is configured to cooperate with the timing gear of the first compressor element 101 so as to synchronize the rotation of the second compressor element 102 with the rotation of the first compressor element 101. It is apparent that alternative embodiments of the rotary compressor 100 are possible, wherein the arrangement of the components, as well as the specific embodiment of, for example, the compressor elements 101, 102 differs from the above-described embodiment. For example, instead of timing gears 103, 104, other suitable elements may be employed to synchronize the rotation of the compressor elements 101, 102, etc.

As can be seen in FIG. 27, the drive shaft 10 is journaled by three bearings, of which two bearings 106, 108 on the housing of the rotary compressor 100 are configured to journal the driven shaft and only one bearing 201 on the housing of the motor 200 is arranged for journaling the drive shaft 2. Due to the rigid connection achieved by the coupling 3, this number of bearings is sufficient to journal the drive shaft 10. Although this embodiment with two bearings on the driven shaft 1 is advantageous as it ensures the alignment of the compressor elements 101, 102 in the rotary compressor 100, as a separate module. However, it is clear that alternative embodiments are possible wherein only one bearing is also provided for journaling the driven shaft 1 in the rotary compressor 100.

Figure 28:
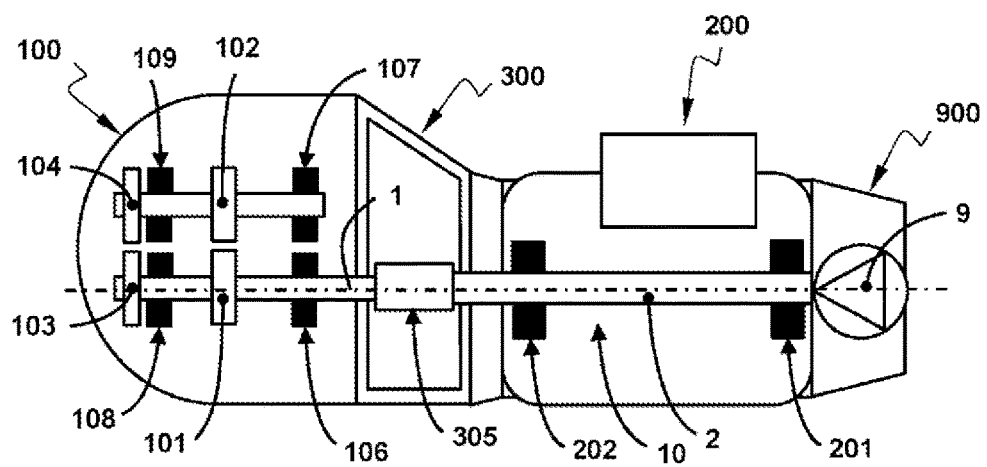
FIG. 28 is a schematic drawing similar to FIG. 27 of an assembly with a flexible coupling from the prior art.
Figure 29:
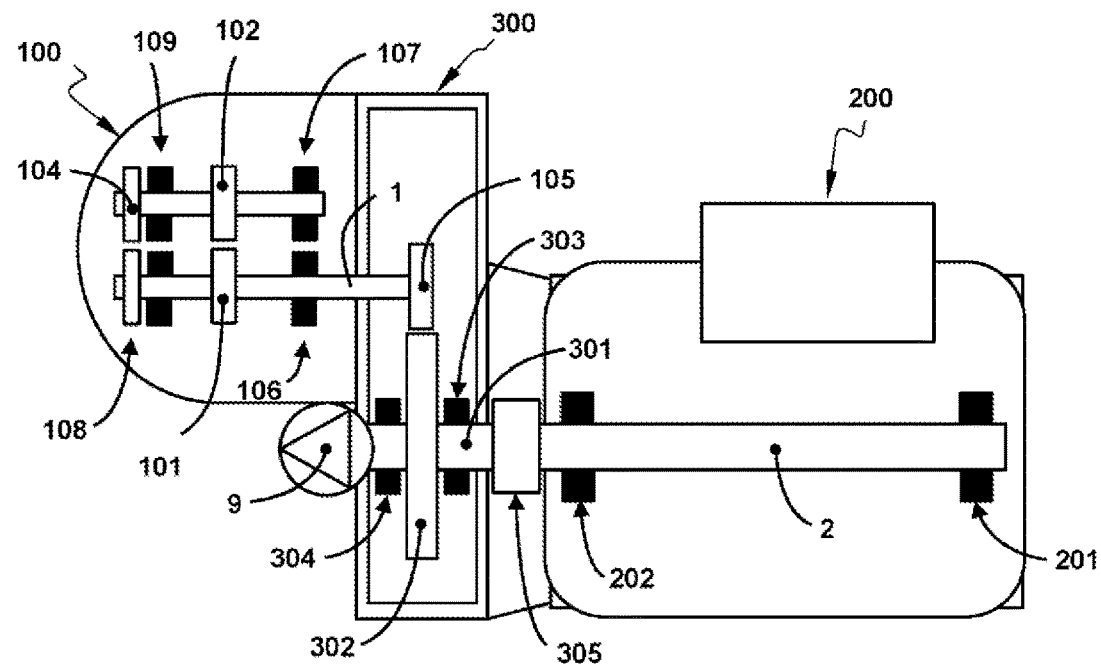
FIG. 29 is a schematic drawing similar to FIG. 27 of an assembly with a gear coupling from the prior art.

For comparison, in FIG. 28 is shown an assembly from the prior art with a known flexible coupling 305, as well as in FIG. 29 is shown a known assembly with a gear coupling and/or gear transmission. Similar elements are designated with similar references and function in a similar manner as described above. It is clear that the embodiment with the flexible coupling 305, as shown in FIG. 28, has two bearings 201, 202 for journaling the drive shaft 2 in the housing of the motor 200 since the flexible coupling 305 does not provide a rigid connection of the driven shaft 1 with the drive shaft 2. It is further clear that, for the embodiment with the gear transmission, also two bearings 201, 202 are required to journal the drive shaft 2 in the housing of the motor 200, since a flexible coupling 305 is used for coupling the drive shaft 2 to the gear transmission, which, by means of a transmission gear 302, drives a pinion 105 which is fastened to the driven shaft 1 of the rotary compressor 100. It is clear that, according to the exemplary embodiment shown in FIG. 29, as shown, additional bearings are required, such as bearings 303, 304 for journaling the transmission gear 302 in the housing 300 of the gear coupling. It is thus clear that, as clarified with reference to FIG. 27, with the embodiment of the coupling 3 as described above, an assembly can be achieved with a reduced number of bearings, giving rise to a simpler, more robust and less maintenance-requiring construction, which can be manufactured in a more efficient manner.

The invention claimed is:

1. A coupling for a drive train of an oil-free rotary compressor, configured to directly couple a driven shaft configured to drive a compression element, movably arranged in an oil-free compression chamber, and a drive shaft driven by a driving element, the coupling comprising:
    a coupling hub arranged over a driven end of the driven shaft,
    a coupling disc that is attached or integrated to a driving end of the drive shaft;
    wherein the drive shaft comprises a hollow passage over an entire length of the drive shaft, and the coupling comprises an elongated stud arranged in the hollow passage of the drive shaft, the elongated stud being coupled to the driven end of the driven shaft and configured to clamp the coupling disc to the coupling hub,
    wherein the coupling further comprises a tensioning element, mounted on the elongated stud, which is configured to hold the elongated stud against a non-driving end of the drive shaft to apply a clamping force to the coupling,
    wherein the coupling comprises a fastening part, which is arranged between the driven end of the driven shaft and the elongated stud, which has a larger diameter than the elongated stud and is configured to couple the elongated stud to the driven shaft.

2. The coupling according to claim 1, wherein the elongated stud comprises an externally threaded end over which the complementary internally threaded tensioning element that is able to be tightened to secure the elongated stud against the non-driving end of the drive shaft.

3. The coupling according to claim 1, wherein the coupling comprises a friction disk arranged between a surface of the coupling hub and an abutting surface of the coupling disc, which is configured to increase the coefficient of friction between the abutting surfaces.

4. The coupling according to claim 1, wherein a surface of the coupling hub and an abutting surface of the coupling disk contain a plurality of mating radial grooves.

5. The coupling according to claim 4, wherein the mating radial grooves are of a Hirth type with a profile angle between 45° to 75°.

6. The coupling according to claim 1, wherein the elongated stud comprises an externally threaded end and the fastening part comprises a complementary internally threaded opening through which the elongated stud is able to be screwed in.

7. The coupling according to claim 1, wherein the coupling comprises a fastening element arranged between the driving end of the drive shaft and the coupling disc, which is configured to clamp the drive shaft to the coupling disc.

8. The coupling according to claim 1, wherein the coupling hub comprises a bevel arranged on a side face of the coupling hub and configured to direct injected lubricant to a component of the coupling requiring lubrication.

9. The coupling according to claim 1, wherein the non-driving end of the drive shaft is configured for connection to a lubricant pump arranged over the drive shaft, and wherein the elongated stud protrudes beyond the lubricant pump.

10. An oil-free rotary compressor comprising a compression element movably arranged in an oil-free compression chamber, and a driven shaft configured for driving the compression element;
a driving element, and a drive shaft driven by the driving element;
a coupling according to claim 1 for directly coupling the driven shaft and the drive shaft.

11. The coupling according to claim 10, further comprising a lubricant injector having an injector nozzle configured to inject a lubricant onto a side face of a coupling hub; and wherein the coupling hub comprises a bevel arranged on a side surface of the coupling hub, configured to direct injected lubricant to a component of the coupling requiring lubrication.

12. The coupling according to claim 10, further comprising a lubricant pump configured to drive a lubricant circuit; wherein the lubricant pump is arranged over a non-driving end of the drive shaft and is connected such that the drive shaft drives the operation of the lubricant pump.

13. The coupling according to claim 12, wherein the lubricant pump is connected to the drive shaft by means of a recess arranged in the lubricant pump, which is configured to connect with a projecting element arranged at the end of the drive shaft, or vice versa.

14. The coupling according to claim 12, wherein the lubricant pump comprises an outer rotor and an inner rotor rotatably arranged in the outer rotor; wherein the outer rotor and inner rotor have complementary trochoidal profile shapes.

15. A coupling for a drive train of an oil-free rotary compressor, configured to directly couple a driven shaft configured to drive a compression element, movably arranged in an oil-free compression chamber, and a drive shaft driven by a driving element, the coupling comprising:
a coupling hub arranged over a driven end of the driven shaft,
a coupling disc that is attached or integrated to a driving end of the drive shaft;
wherein the drive shaft comprises a hollow passage over an entire length of the drive shaft, and the coupling comprises an elongated stud arranged in the hollow passage of the drive shaft, the elongated stud being coupled to the driven end of the driven shaft and configured to clamp the coupling disc to the coupling hub,
wherein the coupling further comprises a tensioning element, mounted on the elongated stud, which is configured to hold the elongated stud against a non-driving end of the drive shaft to apply a clamping force to the coupling,
wherein the coupling comprises a conical clamping ring arranged between the driven end of the driven shaft and the coupling hub, which is configured to clamp the driven shaft to the coupling hub, wherein the conical clamping ring comprises a plurality of sequentially arranged conical clamping rings.

16. A method for coupling a driven shaft and a drive shaft of an oil-free rotary compressor comprising:
directly coupling the driven shaft and the drive shaft in a drive train of the oil-free rotary compressor using a coupling,
wherein the coupling comprises a coupling hub arranged over a driven end of the driven shaft, a coupling disc that is attached or integrated to a driving end of the drive shaft; wherein the drive shaft comprises a hollow passage over an entire length of the drive shaft, and the coupling comprises an elongated stud arranged in the hollow passage of the drive shaft, the elongated stud being coupled to the driven end of the driven shaft and configured to clamp the coupling disc to the coupling hub, wherein the coupling further comprises a tensioning element, mounted on the elongated stud, which is configured to hold the elongated stud against a non-driving end of the drive shaft to apply a clamping force to the coupling,
wherein the coupling comprises a fastening part, which is arranged between the driven end of the driven shaft and the elongated stud, which has a larger diameter than the elongated stud and is configured to couple the elongated stud to the driven shaft.

* * * * *